United States Patent
Sayyarrodsari et al.

(10) Patent No.: US 9,292,012 B2
(45) Date of Patent: Mar. 22, 2016

(54) SECURE MODELS FOR MODEL-BASED CONTROL AND OPTIMIZATION

(71) Applicant: ROCKWELL AUTOMATION TECHNOLOGIES, INC., Mayfield Heights, OH (US)

(72) Inventors: Bijan Sayyarrodsari, Austin, TX (US); Kadir Liano, Austin, TX (US); Alexander B. Smith, Round Rock, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 545 days.

(21) Appl. No.: 13/669,165

(22) Filed: Nov. 5, 2012

(65) Prior Publication Data

US 2014/0128996 A1 May 8, 2014

(51) Int. Cl.
*G05B 17/02* (2006.01)

(52) U.S. Cl.
CPC ...................... *G05B 17/02* (2013.01)

(58) Field of Classification Search
CPC .... G05B 17/02; G05B 17/00; G05B 19/4097; G05B 19/4099; G06F 17/50
USPC .......................................................... 700/29
See application file for complete search history.

(56) References Cited

U.S. PATENT DOCUMENTS

| | | | |
|---|---|---|---|
| 5,752,008 A * | 5/1998 | Bowling ................ | G05B 17/02 700/83 |
| 6,536,037 B1 * | 3/2003 | Guheen et al. ................ | 717/151 |
| 6,615,166 B1 * | 9/2003 | Guheen et al. ................ | 703/27 |
| 6,782,305 B2 * | 8/2004 | Liteplo et al. ................ | 700/182 |
| 6,928,396 B2 * | 8/2005 | Thackston ............. | G06F 17/50 703/1 |
| 7,149,677 B2 * | 12/2006 | Jayaram ................. | G06F 17/50 250/344 |
| 7,574,417 B1 * | 8/2009 | McGreevy et al. ............. | 706/59 |
| 8,019,701 B2 | 9/2011 | Sayyar-Rodsari et al. | |
| 2002/0035450 A1 * | 3/2002 | Thackston ............. | G06F 17/50 703/1 |
| 2003/0004699 A1 * | 1/2003 | Choi et al. ..................... | 703/14 |

(Continued)

FOREIGN PATENT DOCUMENTS

| | | |
|---|---|---|
| CN | 1688950 A | 10/2005 |
| CN | 1703046 A | 11/2005 |

(Continued)

OTHER PUBLICATIONS

Extended European Search Report from European application No. 13191605.8 dated Apr. 16, 2014, 6 pgs.

(Continued)

*Primary Examiner* — Charles Kasenge
(74) *Attorney, Agent, or Firm* — Fletcher Yoder, P.C.

(57) ABSTRACT

In certain embodiments, a control/optimization system includes an instantiated model object stored in memory on a model server. The model object includes a model of a plant or process being controlled. The model object comprises an interface that precludes the transmission of proprietary information via the interface. The control/optimization system also includes a decision engine software module stored in memory on a decision support server. The decision engine software module is configured to request information from the model object through a communication network via a communication protocol that precludes the transmission of proprietary information, and to receive the requested information from the model object through the communication network via the communication protocol.

22 Claims, 14 Drawing Sheets

(56) References Cited

U.S. PATENT DOCUMENTS

| | | | |
|---|---|---|---|
| 2003/0065413 A1* | 4/2003 | Liteplo et al. | 700/96 |
| 2003/0135846 A1* | 7/2003 | Jayaram | G06F 17/50 717/137 |
| 2011/0054864 A1* | 3/2011 | Lundstedt et al. | 703/2 |

FOREIGN PATENT DOCUMENTS

| | | | |
|---|---|---|---|
| CN | 101226615 | A | 7/2008 |
| CN | 102158385 | A | 8/2011 |
| EP | 2045673 | A2 | 4/2009 |
| EP | 2045679 | A2 | 4/2009 |
| EP | 2500787 | A1 | 9/2012 |

OTHER PUBLICATIONS

D. Rumelhart, G. Hinton, and R. Williams, "Learning internal representations by error propagation", Parallel Distributed Processing, 1986.

K. Hornik, M. Stinchcombe, and H. White, "Multi-Layer Feedforward Networks are Universal Approximators", Neural Networks, vol. 2, p. 359, 1989.

M. Jordan and D. Rumelhart, "Forward Models: Supervised Learning with a Distal Teacher", Cognitive Science, vol. 16, p. 307, 1992.

M. Thompson and M. Kramer, "Modeling Chemical Processes Using Prior Knowledge and Neural Networks," AIChE Journal, vol. 40, p. 1328, 1994.

CN Office Action Mailed Dec. 1, 2015.

* cited by examiner

SECURE MODELS FOR MODEL-BASED CONTROL AND OPTIMIZATION

BACKGROUND

The present disclosure relates generally to control systems and, more particularly, the utilization of secure models for model-based control and optimization in control systems.

The overwhelming success of model-based optimization and control in all aspects of modern life (aerospace and transportation, materials and processing, biology and medicine, robotics, information and networks, and so forth) has given mathematical modeling a critical role in all fields of engineering and physics. Conventional model-based optimization and control solutions typically assume full disclosure of the model to the decision engine. This full disclosure can be undesirable if the model contains sensitive information that the owner of the model is not willing to disclose. Currently, the only remedy to safeguard the sensitive content of the model is for the owner of the model to assume full ownership of the entire optimization and/or control solution.

BRIEF DESCRIPTION

In an embodiment, a computer-implemented method includes instantiating a plurality of model objects on a plurality of model servers. Each of the plurality of model objects includes a model of a plant or process being controlled. At least one of the models contains protected information. The method also includes requesting information from the plurality of model objects via a communication network. The method further includes receiving the information from the plurality of model objects via the communication network. In addition, the method includes generating an approximation of at least one of the plurality of the model objects relevant to generating control commands. The method also includes generating control commands based at least in part on the approximation and the information received from the plurality of model objects. The method further includes transmitting the control commands to at least one of the plurality of model objects via the communication network. In addition, the method includes controlling an industrial automation component based on the control commands.

In another embodiment, a control/optimization system includes a plurality of instantiated model objects stored in memory on a plurality of model servers. Each of the plurality of model objects includes a model of a plant or process being controlled. The control/optimization system also includes a plurality of decision engine software modules stored in memory on a plurality of decision support servers. Each of the decision engine software modules includes software instructions for: requesting information from the plurality of model objects via a communication network; receiving the information from the plurality of model objects via the communication network; generating control commands based at least in part on the information received from the plurality of model objects, wherein the control commands are generated collectively by the plurality of decision engine software modules; and transmitting the control commands to at least one of the plurality of model objects via the communication network.

In another embodiment, a control/optimization system includes an instantiated model object stored in memory on a model server. The model object includes a model of a plant or process being controlled. The model object comprises an interface that precludes the transmission of proprietary information via the interface. The control/optimization system also includes a decision engine software module stored in memory on a decision support server. The decision engine software module is configured to request information from the model object through a communication network via a communication protocol that precludes the transmission of proprietary information, and to receive the requested information from the model object through the communication network via the communication protocol.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
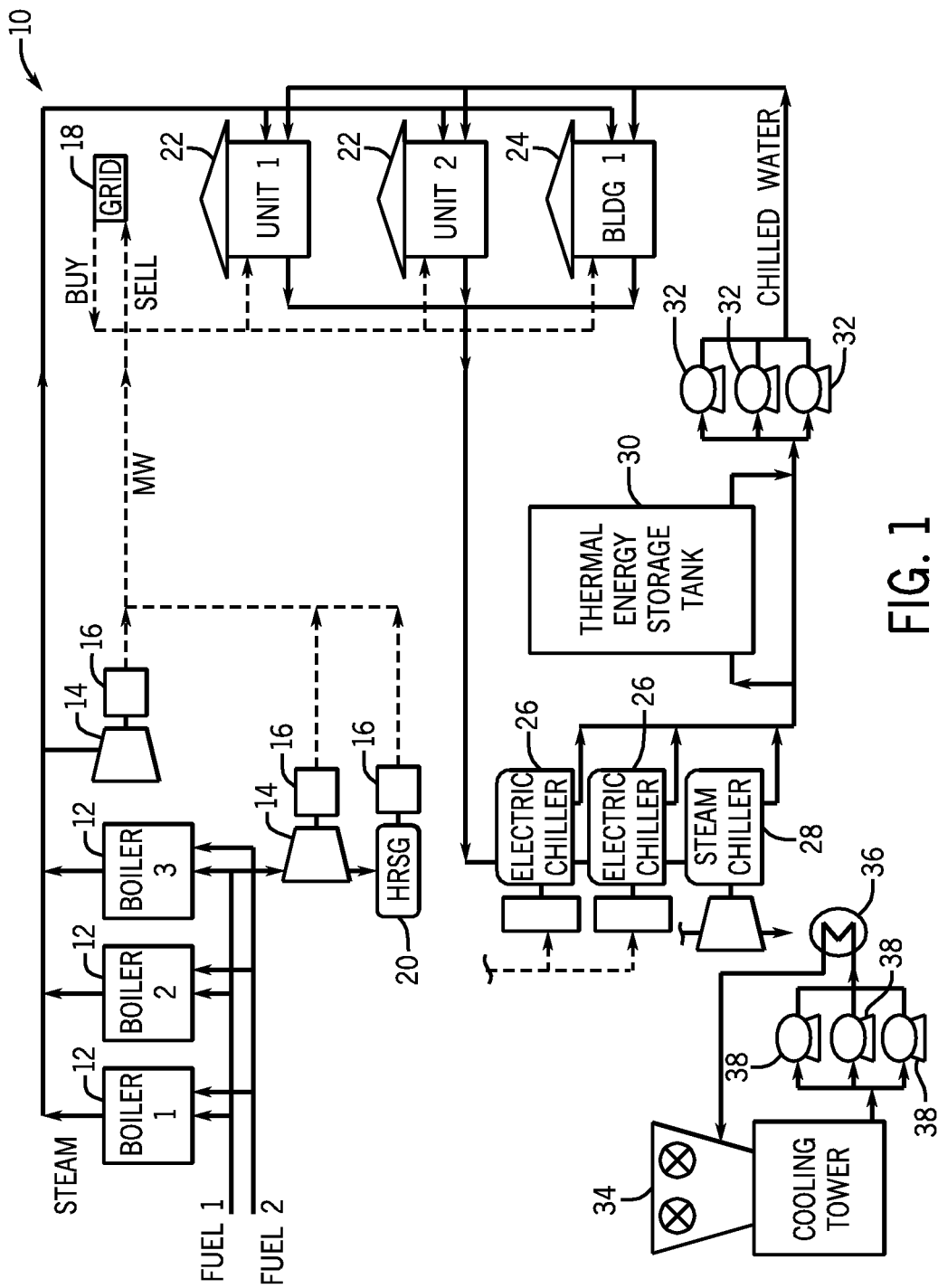
FIG. 1 is a schematic diagram of an exemplary commercial or industrial energy system that may be controlled.

As discussed above, the overwhelming success of model-based optimization and control in all aspects of modern life (aerospace and transportation, materials and processing, biology and medicine, robotics, information and networks, and so forth) has given mathematical modeling a critical role in all fields of engineering and physics. Models of physical processes may be broadly categorized as first-principles (phenomenological, physical, mechanistic) or empirical (statistical, data-centric). A first-principles (FP) model commonly consists of a set of equations describing known relationships among the variables, with coefficients or other parameters that may be fitted to data. Empirical models presume no particular form for the relationships, and instead fit input-output models from data alone. Neural network (NN) models, which employ a large number of parameters in a universal approximation structure, are one of the most widely used forms of nonlinear empirical modeling methods due to their many favorable properties. First-principles have historically dominated nonlinear process modeling. The advent of NNs in the mid-1980s made it possible to obtain well-behaved nonlinear empirical models.

While the complementary strengths and weaknesses of the two modeling approaches were widely recognized, and the value of an approach that allows for their strengths to complement one another is generally accepted, it was only recently that a systematic methodology to build models using complementary strengths of both first-principles and empirical approaches was developed. One such approach is described in greater detail in U.S. Pat. Nos. 8,019,701, 8,032,235, and U.S. Patent Application Publication No. 2005/0187643, each of which is incorporated herein by reference in its entirety for all purposes.

Regardless of the methodology by which the models are developed, as discussed above, conventional model-based optimization and control solutions typically assume full (or at least partial) disclosure of the model to the decision engine (e.g., the quadratic programming (QP) solver at the center of a model predictive control (MPC) solution, the mixed integer linear programming (MILP) solver at the center of a production scheduling solution, and so forth). This full disclosure can be undesirable if the model contains sensitive information that the owner of the model is not willing to disclose. Currently, as discussed above, the only remedy to safeguard the sensitive content of the model is for the owner of the model to assume full ownership of the entire optimization and/or control solution.

This option, however, has several drawbacks. For example, using such techniques may lead to the model-based optimization and control solution being too expensive for end-users with limited on-site expertise. For example, a manufacturing plant often cannot support a full-time position for an optimization expert and, hence, may be forced to rely on outside expertise to support their optimization/control application. Obtaining external assistance for maintenance and troubleshooting of a deployed model-based solution is relatively more expensive. In a worst case scenario, this cost may be prohibitive to the point of abandoning an installed solution. Furthermore, the need to protect proprietary information only increases the cost of maintenance as the plant has to take extra steps to safeguard valuable information. For example, a plant may require a consultant to forego the possibility of working for their competitors, which undoubtedly increases the cost.

In addition, conventional techniques for handling security of models may even lead to internal exposure of highly valued proprietary information being expanded unnecessarily. For example, a plant control engineer may have access to the detailed reaction model even though he/she does not necessarily need access to that level of detail. In addition, any notion of collaborative decision making between different entities (e.g., collaborative supply-chain optimization) may be hindered by concerns over disclosure of proprietary information. For example, pricing models are some of the most highly guarded information for a company, and yet effectively participating in a true supply chain optimization solution involving different tiers of supply chain generally requires accurate pricing strategy from all participants. As a consequence, the use of a cloud as a platform for decision support is hindered by concerns over ownership and security of the proprietary data.

A solution that addresses the ownership and security concerns in a fundamentally sound manner will be the cornerstone of any meaningful decision-support solution through cloud infrastructure. The embodiments described herein include a methodology and algorithms for addressing the above listed challenges. More specifically, the embodiments described herein treat models as secure servers that provide services to clients. In certain embodiments, the decision engine (e.g., optimization and control engine) creates an approximation of the protected model by inquiring mutually agreed upon model properties without ever accessing model details. The decision engine may determine optimal values for decision variables based on the online approximation that is created. In addition, in certain embodiments, feedback from the implications of the deployed decisions may be used to modify the online approximations as needed. Furthermore, in certain embodiments, the properties of the approximate online model may be reported back to the protected model server in order to provide the authorized owners of the model with necessary feedback for maintaining/modifying the models as needed. In certain embodiments, queries to the models may be encrypted to further protect the protected model information from unauthorized disclosure. The embodiments described herein are generally presented as relating to the manufacturing industry and utility systems. However, the systems and methods described herein are not limited to such applications, and may indeed be extended to any and all applications where protection of system modeling information is desirable.

The embodiments described herein enable model-based computations, model-based optimization and control in particular, to be carried out while keeping part of or the entire model content secure. In particular, at no point will content of a model deemed to be proprietary be disclosed to the computational engine that utilizes that model in its computations. As such, the embodiments described herein are fundamentally different from conventional systems and methods that secure access to model content via passwords, for example. To enable this objective, the embodiments described herein include a software implementation methodology that will fundamentally change the way model-based computations (e.g., model-based optimization and model predictive control) are carried out today.

The embodiments described herein may prove beneficial for myriad applications. For example, one such application is in the realm of planning and scheduling of operations in an industrial plant. Complex applications such as providing steam, chilled water, and electricity to a sophisticated user (e.g., a petrochemical complex, a university campus, a large residential complex, and so forth) involves constant decisions by plant operation personnel on which resources to utilize, what the set points for that resource (e.g., capacity) should be, for how long that resource must operate, and what existing or impending constraints must be avoided and how. The complexity of decision-making in such applications justifies the need for a systematic optimization solution in which various components of the system, operational procedures and constraints, economic objectives, and so forth, are properly modeled. Even within a single industrial plant, the plant may decide to avoid disclosing their operational procedures to a firm providing automation solutions as that very firm may deliver a solution to their competitors. The embodiments described herein enable safeguarding of the operation procedures in such circumstances, for example.

Another exemplary application includes optimizing product compositions given acceptable recipe alternatives. Many manufacturing operations involve producing an end-product for which an acceptable quality can be reached following two or more recipe alternatives (e.g., powdered cheese in a dairy plant). A principled approach to economic optimization of the production path requires that the decision engine have access to the recipe options. Often, product recipes are the most guarded proprietary information for a company and, hence, the ability to avoid disclosure of such recipes is viewed as an enabling technology for deploying a decision support solution.

Another exemplary application includes multi-unit optimization in an industrial plant. Complex processes ranging from powder milk drying in a dairy plant to boiler operation in a power plant are often multi-unit operations that can benefit from a principled optimization strategy to improve the energy efficiency of normal operations, reduce the cost of response to process disturbances, improve their ability to respond profitably to the changes in market conditions, and so forth. Addressing proprietary information in the models that are used in a systematic optimization solution in this scenario is a well-recognized need.

Another exemplary application includes multi-plant optimization in a manufacturing enterprise. An extension of the multi-unit optimization, the economic optimization of multiple plants (e.g., within a manufacturing enterprise) may impose even more requirements on protecting model contents and, hence, the embodiments described herein will be an enabling technology for optimal coordination of multiple production plants.

Another exemplary application is supply chain optimization in a manufacturing enterprise. This is a further extension to the multi-plant optimization scenario described above. In a supply chain, the issue of protecting model content (e.g., the supplier's pricing strategy for components provided to a manufacturing facility) receives higher prominence for obvious business reasons. The embodiments described herein enable a true supply chain optimization solution.

Another exemplary application includes optimizing buy/sell decisions in an enterprise. An example of such buy/sell decisions is the decision of a utility plant to purchase gas, coal, biofuel, and electricity from the grid, with the potential of selling steam, chilled water, and even electricity back to various customers. Such decisions are growing in complexity and hence a systematic model-based optimization tool will become increasingly indispensable. As an example, the current trend in smart grids (e.g., where each node on the electric grid can perform as both source and sink) adds further complexity to the decision making process. The embodiments described herein are an enabling technology for such applications.

There is often a discontinuity between the generally offline (i.e., not during operation) planning and scheduling activities of a plant and the generally online (i.e., during operation of the plant) control and operation activities of the plant. The embodiments described herein address the three main challenges that have contributed to the persistence of this deficiency. First, the embodiments described herein provide a versatile modeling framework for representing an entire plant and, indeed, an entire enterprise including one or more plants. Existing modeling frameworks are generally unable to: (a) capture relevant details of plant operation as it pertains to economic objectives of the enterprise, (b) avoid prohibitive complexity given the number of components to be included in the models that represent the plants, and (c) maintain modularity such that there is an intuitive correspondence between the components of the physical plants/processes and the model components. Certain embodiments described herein address these challenges by employing a parametric hybrid modeling framework, such as described in greater detail in U.S. Pat. Nos. 8,019,701, 8,032,235, and U.S. Patent Application Publication No. 2005/0187643, each of which is incorporated herein by reference in its entirety for all purposes. However, it should be noted that the techniques described herein may be extended to other types of modeling frameworks whereby models of the plant or process being controlled are utilized.

Second, the embodiments described herein address the conventional separation of the offline interactions with the models (e.g., model building, planning, scheduling interactions) that represent the plants, and the online interactions (e.g., the control and operation interactions) with the models. In particular, in conventional systems, the deployed models are not transparent to all users. In other words, the quality of the models and their components are not easily measurable or accessible as the models are deployed to an online environment. In these conventional systems, modification of the models is generally an offline exercise, and the expertise for modifying the models is generally highly centralized. However, in reality, the people who are qualified to modify one component of a model may have no qualification to modify another component of the model, and these different people often physically reside in different locations. Generally speaking, asynchronous modification of the model components is not possible, and modification frequency widely varies depending on the model type, operation scenario, and so forth. The embodiments described herein address these challenges by employing a transparent model deployment strategy while also maintaining security of proprietary information related to such models.

Third, the embodiments described herein provide a graphical optimization language that eliminates the communication barrier between optimization software and end users (plant operators, accounting department, financial department, and so forth). In particular, the graphical language for optimization enables a lower level of competency to implement and/or deploy optimization solutions. In other words, rather than requiring a Ph.D. with an optimization background, a plant manager with process knowledge will be able to own the optimization solution. In addition, the graphical language provides distributed development, deployment, and maintenance capabilities such that the composition of the optimization problem and subsequent modifications to the optimization problem may be carried out with input from relevant stakeholders in their normal operation settings.

The embodiments described herein enable the handling of various aspects of operation (e.g. accommodation of scheduled maintenance for key components, robustness with respect to disruptions in the supply chain or available capacity, energy efficiency and low environmental footprint of the operation, responsiveness to market pricing pressures, and so forth) in a systematic manner with full transparency of the objectives, priorities, and constraints of the underlying models, but also with the capability of securing proprietary information. In particular, the embodiments described herein enable graphical setup, execution, and reporting of large-scale (potentially non-linear) optimization problems in a manner that the plant-wide and/or enterprise-wide optimization solutions may be simultaneously managed by a distributed set of stakeholders without the need for a centralized authority to act as a gatekeeper of the information and transactions. To achieve this objective, the embodiments described herein include core enabling algorithmic concepts, as well as a software implementation methodology.

As described above, the embodiments described herein have many potential application scenarios. For example, the embodiments described herein facilitate improved planning and scheduling of operations in an industrial plant. Complex applications such as providing steam, chilled water, and electricity to complex energy users (e.g., petrochemical complexes, university campuses, large residential complexes, and so forth) involve constant decisions by plant operation personnel, such as which resources should be utilized, what set points for the resources (e.g., capacity) should be set, for how long the resources should operate, what existing or impending constraints should be avoided, and so forth. The complexity of the decision making in such applications justifies the need for a systematic optimization solution, but the challenges described above have heretofore impeded the development of a fully functional solution.

In addition, the embodiments described herein facilitate the optimization of product compositions given acceptable recipe alternatives. Many manufacturing operations involve producing end products that may be reached via alternative recipes (e.g., cheese manufacturing in a dairy plant). The embodiments described herein include a principled approach to optimal scheduling of the manufacturing process such that, at any given time, the end product having a predetermined quality specification is made with the optimal set of ingredients.

Furthermore, the embodiments described herein also facilitate multi-unit optimization in an industrial plant. Complex processes ranging from powder milk drying in a dairy plant to boiler operation in a power plant are inherently multi-unit operations that may benefit from a principled optimization strategy to improve, for example, the energy efficiency of operation, reduce the cost of response to process disturbances, improve the ability to respond profitably to changes in market conditions, and so forth.

The embodiments described herein also facilitate optimizing buy and/or sell decisions for an industrial plant on an electric grid. Many large consumers of electricity, such as industrial plants or university campuses, have in-house generation capacity. The economics of the in-house generation versus purchase from an electric grid is growing increasingly more complex as utility companies move away from fixed pricing in order to maximize their profitability. The current trend in smart grids, where each node on the electric grid may perform as both source (i.e., provider of power) and sink (i.e., consumer of power), further complicates the decision making process. A principled optimization solution may assist such customers to make the most favorable decisions at any given time given their priorities and objectives.

The embodiments described herein include several aspects that enable the applications described above. For example, the embodiments described herein provide online transparency to model quality and performance while also maintaining security of proprietary information. Without the ability to investigate model quality (both for individual units, and for a network built using these units), model fidelity may not be sustained. For example, with a purely empirical modeling paradigm, it may not be possible to pinpoint a source of quality deterioration and, hence, online visibility of the models may not be fully achieved. A detailed first-principles based model may suffer from this lack of transparency. In addition, the ability to modify a targeted component of a deployed model without forcing deactivation of the model is highly desirable. The online modification of the transparent models in this embodiment includes and surpasses that of parameter adaptation, and encompasses the inclusion of a new parameterized model to replace an earlier underperforming parameterized model. Therefore, the online transparency described herein generally improves model quality and performance.

In addition, the embodiments described herein provide for asynchronous authoring capability for the problem formulation by a distributed set of users. The large scale of the optimization problem, and the limited scope of responsibility and competency for plant operators and engineers, makes distributed asynchronous authoring of the problem statement desirable (and often necessary). For example, in a utility plant, a chilled water loop and a steam loop are operationally coupled. The experts that understand the chilled water loop generally know very little about the steam loop operation, and most likely are not allowed and/or do not want to assume responsibility for the operation of the steam loop, and vice versa. The distributed authoring capability should also apply to the outcome of the optimization solution. The outcome of the plant-wide and/or enterprise-wide optimization solution (e.g., a Gantt chart of operation schedules for chillers of a utility plant) is presentable to a distributed set of users (e.g., operators, plant managers, and so forth). In addition, authorized stakeholders are enabled to edit proposed schedules without creating inconsistencies. Furthermore, the distributed users are enabled to update operational constraints and request rescheduling in a consistent manner.

The embodiments described herein also provide graphical authoring capabilities for the problem formulation by the distributed set of users. Without graphical editing capability, a typical plant operator would not be able to directly contribute to model maintenance. In addition, without a graphical language for defining the optimization problem or interpreting the solver decisions, a typical plant operator or engineer would not be able to contribute to a meaningful definition of the optimization problem. The graphical authoring capability described herein also applies to the outcome of the overall optimization problem. The outcome of the plant-wide and/or the enterprise-wide optimization solution (e.g., a Gantt chart of operation schedules for chillers) is presentable to the distributed set of users (e.g., operators, plant managers, and so forth). The authorized stakeholders may graphically edit the proposed schedules without creating inconsistencies. In addition, the distributed set of users may graphically update operational constraints and request rescheduling in a consistent manner. The intuitiveness of the graphical authoring capability enhances usability and uptime of the optimization solution.

In addition, the embodiments described herein incorporate real-time measurements and information from the plant floor and/or business systems. In a plant-wide and/or enterprise-wide optimization, the network is often composed of a large number of component models, complex network connectivity, and a dynamic set of operational conditions, constraints, and objectives. The information needed to keep this "problem formulation" up-to-date is obtained from sources that are distributed throughout the enterprise, and often function with local autonomy. A solution that requires centralized information handling may become untenable. In particular, real-time measurements influence the models in the problem formulation (e.g., efficiency curves often change based on the current operating condition of the equipment). The ability to achieve integration with real-time measurements can be an obstacle to the successful adoption of plant-wide optimization solutions. Model transparency facilitates successful incorporation of real-time information as the changes may be viewed by all relevant stakeholders.

Turning now to the drawings, FIG. 1 is a schematic diagram of an exemplary commercial or industrial energy system 10. As described above, the energy system 10 of FIG. 1 is an example of the types of plants that may benefit from the embodiments described herein. FIG. 1 illustrates the various energy generation and consumption components that are typical in commercial and industrial energy systems. For example, FIG. 1 includes boilers 12 that are configured to receive fuel and generate steam for use as a source of power in other components of the energy system 10. For example, in certain embodiments, the steam produced by the boilers 12 may be used by cogeneration units 14 to drive generators 16, which generate electrical power that may be consumed by components of the energy system 10 and/or sold to an electrical grid 18. In addition, in certain embodiments, a heat recovery steam generation (HRSG) system 20 may be used for secondary recovery of heat through generation of steam, which may also be used to drive generators 16 for generating electrical power. In addition to selling electricity to the grid 18, the energy system 10 may also buy electricity from the grid 18. Whether the energy system 10 buys from or sells to the grid 18 at any particular point in time depends on the current electricity supply of the energy system 10, the current electricity demand of the energy system 10, electrical storage capacity of the energy system 10, buy/sell prices to and from the grid 18, day/night cycles of the energy system 10, the availability and capacity of other generation systems connected to the grid 18, and so forth.

As illustrated, the energy system 10 may include process units 22 and buildings 24 that consume some of the electrical power, chilled water, and/or steam. In addition, in certain embodiments, the energy system 10 may include electric chillers 26 and steam chillers 28, which may be associated with a thermal energy storage tank 30, and may consume energy to generate chilled water, which may be pumped to the process units 22 and buildings 24 by pumps 32 for cooling, such as for building cooling, industrial process cooling, and so forth. In addition, heated water from, for example, the chillers 26, 28 may be circulated through a cooling tower 34 and associated heat exchangers 36 and pumps 38, where the heated water is cooled for later use.

Therefore, in summary, various components may produce energy (i.e., referred to as sources) and/or consume energy (i.e., referred to as sinks) in a typical commercial or industrial energy system 10. Indeed, the components shown in FIG. 1 are merely exemplary of the components that may comprise a typical commercial or industrial energy system 10. As illustrated in FIG. 1, the various components of the energy system 10 may be configured to consume and/or produce energy based upon different technologies. The interdependence of the components of the energy system 10 may, in certain embodiments, be extremely complex. In addition, various external components, such as the electrical grid 18 may add to the complexity of the energy system 10. Again, the energy system 10 illustrated in FIG. 1 is merely exemplary of the types of complex plants and enterprises that may utilize the graphical modeling framework described herein.

Figure 2:
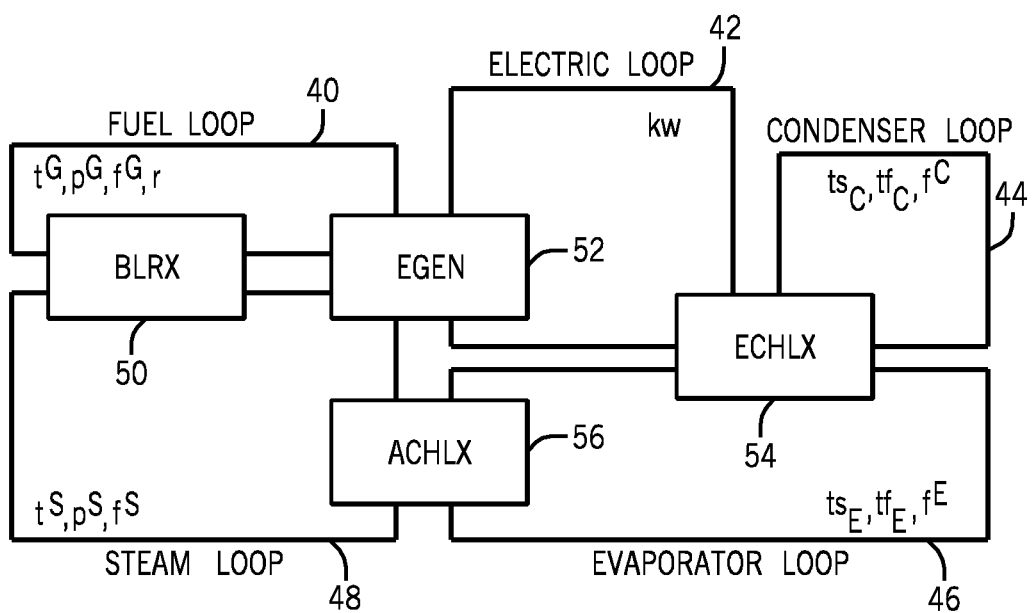
FIG. 2 is a block diagram of exemplary components of the energy system of FIG. 1, illustrating various interconnections.

FIG. 2 is a block diagram of exemplary components of the energy system 10 of FIG. 1, illustrating various interconnections. In particular, FIG. 2 depicts various energy loops that are typical in commercial and industrial energy systems 10. For example, key energy loops include a fuel loop 40, an electric loop 42, a condenser loop 44 (e.g., cooling tower water), an evaporator loop 46 (e.g., chiller water), and a steam loop 48. The various energy loops 40, 42, 44, 46, 48 illustrated in FIG. 2 are merely exemplary and not intended to be limiting. In other embodiments, other energy loops may be used to model the energy system 10.

Each energy loop 40, 42, 44, 46, 48 includes a set of defining variables that function as inputs and outputs for the respective energy loop 40, 42, 44, 46, 48. For example, the fuel loop 40 includes $t^G$, $p^G$, $f^G$, and r, where $t^G$ is the fuel temperature, $p^G$ is the fuel pressure, $f^G$ is the fuel flow rate, and r is the heat factor for the fuel loop 40. The electric loop 42 includes kw, which is the amount of electricity supplied. The condenser loop 44 includes $ts^C$, $tf^C$, and $f^C$, where $ts^C$ is the temperature of the water entering the cooling tower(s), $tf^C$ is the temperature of the water exiting the cooling tower(s), and $f^C$ is the flow rate for the water in the condenser loop 44. The evaporator loop 46 includes $ts^E$, $tf^E$, and $f^E$, where $ts^E$ is the temperature of the chilled water leaving the chillers, $tf^E$ is the temperature of the chilled water returning to the chillers, and $f^E$ is the chilled water flow rate. The steam loop 48 includes $t^S$, $p^S$, and $f^S$, where $i^S$ is the steam temperature, $p^S$ is the steam pressure, and $f^S$ is the steam flow. Again, all of the variables for the energy loops 40, 42, 44, 46, 48 illustrated in FIG. 2 are merely exemplary and not intended to be limiting. In other embodiments, other variables may be used to define the energy loops 40, 42, 44, 46, 48.

As illustrated, the energy loops 40, 42, 44, 46, 48 are coupled to component blocks, which represent groups of actual energy-related equipment of the energy system 10 that typically supply energy to or consume energy from the energy loops 40, 42, 44, 46, 48. For example, a boiler block 50 is coupled to both the fuel loop 40 and the steam loop 48, an electrical generator block 52 is coupled to the fuel loop 40, the electric loop 42, and the steam loop 48, an evaporation chiller block 54 is coupled to the electric loop 42, the condenser loop 44, and the evaporator loop 46, and an absorption chiller block 56 is coupled to the evaporator loop 46 and the steam loop 48. Again, the various component blocks 50, 52, 54, 56 illustrated in FIG. 2 are merely exemplary and not intended to be limiting. In other embodiments, other component blocks may be coupled to the various energy loops 40, 42, 44, 46, 48.

The disclosed embodiments facilitate both planning/scheduling and control/operation of the energy system 10 of FIGS. 1 and 2. More specifically, as described in greater detail below, the embodiments described herein include a graphical language and interface and transparent modeling framework for the energy system 10 of FIGS. 1 and 2 that enables different sets of distributed users having widely different areas of expertise to interact with parametric hybrid models for the individual component blocks (e.g., groups of equipment) of the energy system 10. Indeed, it should be understood that while the embodiments described herein are presented as relating to energy-efficient operation of energy systems 10, in other embodiments, the graphical language and interface and transparent modeling framework of the embodiments described herein may be extended to other applications, such as chemical manufacturing, oil and gas processing, and so forth.

The disclosed embodiments target optimization of the energy system 10 of FIGS. 1 and 2 that addresses the computational complexity challenge of modeling the many various energy-related components of the energy system 10, including individual parametric hybrid models for generation units, boilers, chillers, pumps and fans, and so forth, as well as parametric hybrid models for constraints and objectives. In addition, the disclosed embodiments provide for online modification of model structure and/or parameters by the different sets of distributed users via a graphical language and interface and transparent modeling framework while maintaining security of proprietary information.

Parametric objective functions may be built to reflect the economic objectives of the operation of the energy system 10. A parametric constraint set may be built to reflect constraints of the operation of the energy system 10 (e.g. constraints on cooling capacity, constraints on allowable emissions, and so forth). As described in greater detail below, the graphical language described herein enables all stakeholders in the energy system 10 to interact with the parameters of the parametric hybrid models, the parametric objective functions, and the parametric constraint sets, even if access to the underlying parametric hybrid models are limited to particular users (e.g., modeling experts). Energy load models may also be built to predict load profiles over an operation time horizon. The load models may include, for example, chilled water demand, steam demand, electricity demand, and so forth. Based on all of these models and objectives, the optimization problem for the energy system 10 may then be solved to determine the optimal profile for the operating conditions of the energy system 10, subject to the parametric constraint set.

Because of the complexity of typical commercial and industrial energy systems 10, the hybrid techniques described herein provide unique advantages. Hybrid techniques leverage known fundamental relationships (e.g., known kinetic models, and so forth) that are more or less available from fundamental process modeling with empirical modeling techniques for phenomena not accurately modeled due to a lack of fundamental understanding. Because industrial-scale energy equipment is generally uniquely designed and developed for intensive operations, significant calibration or tuning of published or available fundamental modeling with specifically-designed empirical modeling techniques provides more accurate energy models. In turn, a more accurate energy model enables a more highly performing model-based optimization and control solutions. Therefore, an ideal modeling solution incorporates the best available fundamental models and empirical models tuned or calibrated to best match collected energy equipment measurement/performance data over varying operating phases of the energy system 10. Depending on the accuracy of the parametric hybrid models, either linear (e.g. single value) parameters or nonlinear (e.g. kinetic parameters that vary with measured energy) variables may be identified and used.

Figure 3:
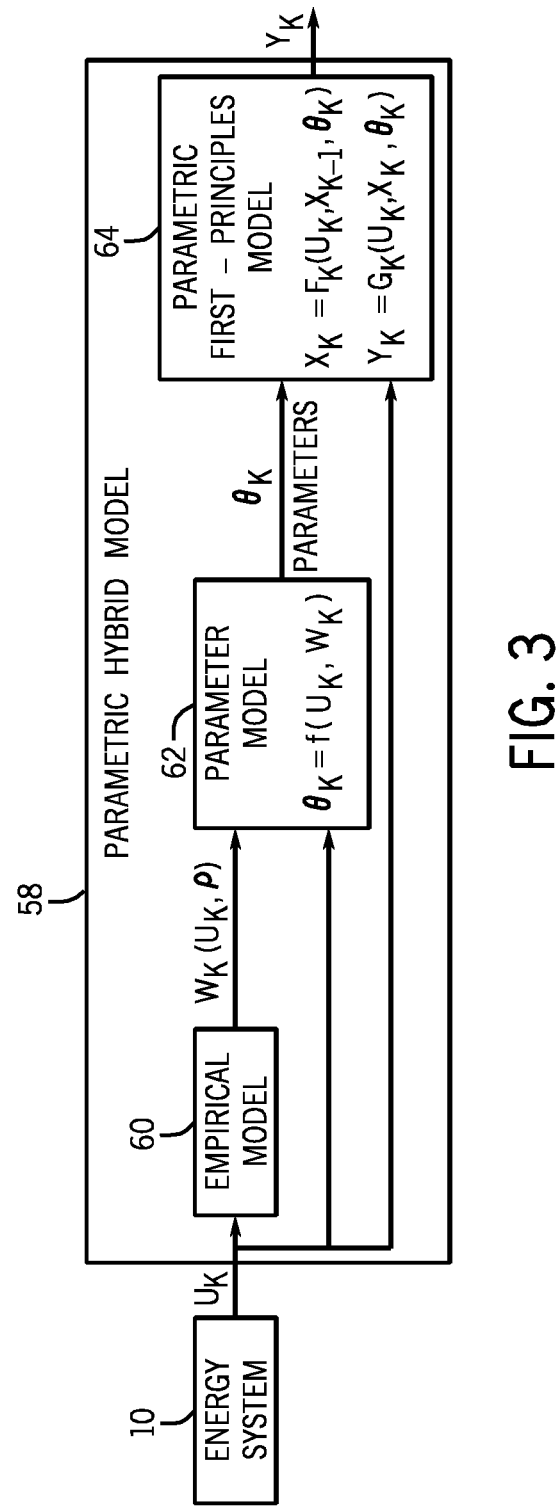
FIG. 3 is a block diagram of an exemplary parametric hybrid model for modeling the energy system of FIG. 1.

FIG. 3 is a block diagram of an exemplary parametric hybrid model 58 for modeling the energy system 10 and/or, more particularly, individual component blocks 50, 52, 54, 56 of the energy system 10. As illustrated, energy variable inputs $u_k$ from the energy system 10 may be received by the parametric hybrid model 58. The energy variable inputs $u_k$ may, for example, include the variables of the energy loops 40, 42, 44, 46, 48 described above. An empirical model 60 may use the energy variable inputs $u_k$ to generate empirical model outputs $w_k$. The empirical model outputs $w_k$ may be a function of the energy variable inputs $u_k$ and empirical model parameters $\rho$. Both the empirical model outputs $w_k$ and the energy variable inputs $u_k$ may be directed into a parameter model 62 of the parametric hybrid model 58. Fundamental model parameters $\theta_k$ from the parameter model 62 may be a function of the energy variable inputs $u_k$ and the empirical model outputs $w_k$. It should be noted that both the length of the fundamental model parameters $\theta_k$ and the value of the parameter vector may vary as a function of the energy variable inputs $u_k$ and the empirical model outputs $w_k$. In certain embodiments, the fundamental model parameters $\theta_k$ may include the empirical model outputs $w_k$, or may simply be identical to the empirical model outputs $w_k$ in their simplest form. The fundamental model parameters $\theta_k$ may be directed into a parametric first-principles model 64, which may be either a steady-state or dynamic model. In addition, the parametric first-principles model 64 may receive the energy variable inputs $u_k$ from the energy system 10. The parametric first-principles model 64 may model measured or unmeasured energy state variables $x_k$ and energy variable outputs $y_k$. The energy state variables $x_k$ may be a function of the energy variable inputs $u_k$, previous energy state variables $x_k$, and the fundamental model parameters $\theta_k$. The energy variable outputs $y_k$ may be a function of the energy variable inputs $u_k$, current energy state variables $x_k$, and the fundamental model parameters $\theta_k$. The energy variable outputs $y_k$ may be directed from the parametric hybrid model 58 as outputs. Therefore, the general equations defining the parametric hybrid model 58 include:

$$w_k = f_1(u_k, \rho);$$

$$\theta_k = f_2(u_k, w_k);$$

$$x_k = F_k(u_k, x_{k-1}, \theta_k); \text{ and}$$

$$y_k = G_k(u_k, x_k, \theta_k);$$

where $u_k$ is a vector of energy variable inputs over time k, $\rho$ is a vector of empirical model parameters, $w_k$ is a vector of empirical model outputs over time k, $\theta_k$ is a vector of fundamental model parameters over time k, $x_k$ is a vector of measured or unmeasured energy state variables over time k, and $y_k$ is a vector of energy variable outputs over time k.

The parametric hybrid model 58 is extremely efficient for real-time optimization and control computations. This computational efficiency is critical to the successful implementation of a model-based optimization and control strategy that optimizes the performance of the energy system 10. Dynamic optimization methods are used to calculate optimal dynamic trajectories during operation of the energy system 10 to optimize the efficiency of the energy system 10 as a whole. In particular, trajectories may be calculated for individual components of the component blocks 50, 52, 54, 56 of the energy system 10 and optimized to a target over time based on parameters that are closely related to, but are not the same as, the input and output variables which are listed above as being associated with the various energy loops 40, 42, 44, 46, 48. More specifically, as illustrated in FIG. 3, the fundamental model parameters $\theta_k$ generated by the parameter model 62 may be a set of parameters that are not directly analogous to either the energy variable inputs $u_k$ or the energy variable outputs $y_k$. Rather, certain derived measures (e.g., the parameters) of the energy system 10 over the course of operation of the energy system 10 may be used to generate trajectories that strongly correlate to performance variables for the energy system 10, even when the performance variables for the energy system 10 are not directly measurable.

For example, the efficiency of a boiler may not be measured during operation of the energy system 10, and may be used as a parameter, which correlates to, but is not that same as, energy variable inputs and outputs $u_k$, $y_k$ for the boiler component block 50. Therefore, this parameter may be calculated during operation of the energy system 10 (and, more specifically, the components of the boiler component block 50) with the parametric hybrid models 58, and may be used in calculating an optimal trajectory for an input to the boiler (e.g. the firing rate of the boiler). This allows better real-time control during operation of the energy system 10, such that intermediate performance of the energy system 10 may be more closely targeted and maintained. In certain embodiments, an optimal trajectory function may be determined by solving:

$$\min(u_k)\Gamma(\hat{y}_k, \hat{y}_k^{Trajectory}), \text{ subject to:}$$

$$w_k = f(u_k, \rho);$$

$$\theta_k = f(u_k, w_k);$$

$$x_k = F_k(u_k, x_{k-1}, \theta_k),$$

$$y_k = G_k(u_k, x_k, \theta_k); \text{ and}$$

$$L < u_k < H;$$

where $\Gamma(\ )$ is the objective function defined over energy variable outputs, $\hat{y}_k$ is the energy variable outputs ($\hat{y} \in y$), and $\hat{y}_k^{Trajectory}$ is an explicit or implicit representation of a desired energy variable trajectory. In addition, constraints (e.g., L and H above) may be trajectory functions. The minimization of the above objective function is achieved through adjustments to the decision variables $u_k$ (e.g., the energy variable inputs). Note that the optimization problem above is merely exemplary and not intended to be limiting. For example, the objective function $\Gamma(\ )$ may be defined to include penalties on decision variables $u_k$.

The dynamic optimization described above may be implemented using various methods. The level of detail included in the parametric hybrid models 58 may vary depending upon the level of complexity that may be handled in real time. In other words, the parametric hybrid modeling allows a systematic way of compromising between model accuracy and computational complexity and, therefore, offers flexibility to handle energy systems 10 of varying levels of complexity. More specifically, the complexity of any given parametric hybrid model 58 is a function of both the complexity of the system being modeled, and the simplicity of the parametric hybrid model 58 needed to make real-time computations tractable. As such, the parametric hybrid model framework offers a systematic framework for optimally trading off model accuracy versus computational efficiency. In defining parametric hybrid models 58, in certain embodiments, short-cut models may be used (e.g., in the parametric first-principles models 64). These short-cut models may be linear or nonlinear, dynamic or steady-state, and so forth. The parametric hybrid model framework remains current with the real-time operating conditions of the energy system 10, and allows for online modification of the model parameters, which are not direct inputs or outputs of the energy system 10, and hence the decision engine (i.e., the optimization and control) always has valid models upon which to base decisions.

The parametric hybrid model 58 models both steady-state and the non-steady-state behavior of the processes of the energy system 10, whether the behavior is linear or nonlinear, with respect to critical variables, where gains and/or dynamics vary during operation of the energy system 10. The optimization problem formulation for optimization and/or control of the energy system 10 has: (1) parametric hybrid models 58 of the components of the energy system 10, (2) parametric hybrid models 58 of how these components are connected together to define the energy system 10, (3) a parametric hybrid description of what the performance objectives are, and (4) a parametric hybrid description of what the constraints are. It should be noted that a parametric hybrid model/description may degenerate to a constant in simple cases. Some of the variables (e.g., the parameters described herein) that are indicative of performance of the energy system 10 (or individual components of the energy system 10) may not be measured or even easily measurable. The parametric hybrid models 58 are used to model these variables (e.g., the parameters described herein) as well. Then, an optimizer may make decisions as to which inputs to the energy system 10 should be given system models/objectives/constraints. As such, the parametric hybrid model framework allows all of the models to remain current, while solving the optimization problem (i.e., making decisions) as quickly as possible. Achieving these two goals enables the optimal energy management system to continuously make the best decisions based on what is actually happening with the energy system 10 in substantially real-time during operation of the energy system 10.

Figure 4:
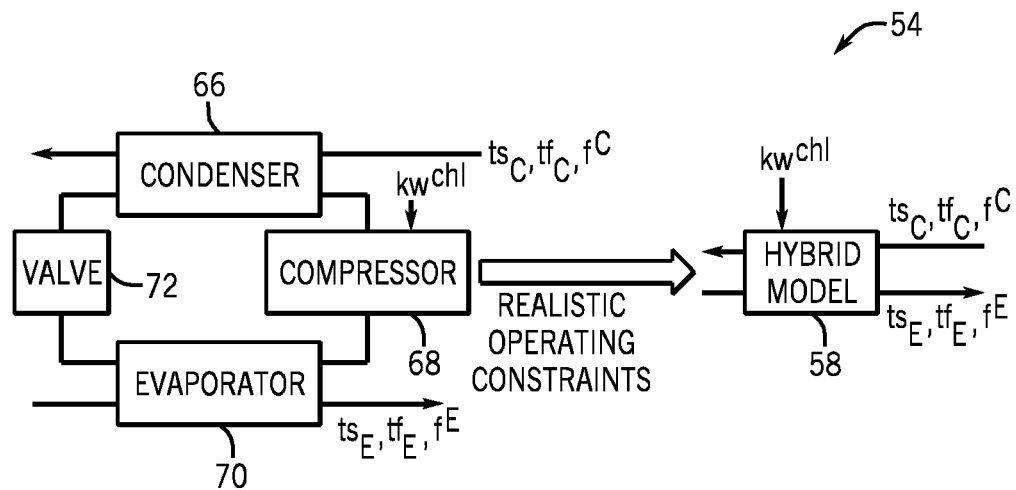
FIG. 4 is a block diagram of an exemplary evaporation chiller block of FIG. 2.

As described above with respect to FIG. 2, each component block 50, 52, 54, 56 may be associated with energy loops 40, 42, 44, 46, 48 that contribute to operation of the component block 50, 52, 54, 56. In addition, each component block 50, 52, 54, 56 will include actual energy-related equipment components. Moreover, each component block 50, 52, 54, 56 may be modeled by a parametric hybrid model 58 as described above with respect to FIG. 3. For example, FIG. 4 is a block diagram of an exemplary evaporation chiller block 54 of FIG. 2. As illustrated, the evaporation chiller block 54 may include a condenser 66, a compressor 68, an evaporator 70, and a valve 72. As such, the evaporation chiller block 54 may be associated with the condenser loop 44 (e.g., the condenser 66), the electric loop 42 (e.g., the compressor 68), and the evaporator loop 46 (e.g., the evaporator 70).

Accordingly, the variables of the condenser loop 44, the electric loop 42, and the evaporator loop 46 will be associated with the evaporation chiller block 54. More specifically, the variables $ts^C$, $tf^C$, $f^C$, kw, $ts^E$, $tf^E$, and $f^E$ comprise input and output energy variables $u_k$, $y_k$ for the evaporation chiller block 54. However, a parametric hybrid model 58 may be built that incorporates fundamental models for the condenser 66, compressor 68, evaporator 70, and valve 72 (e.g., in a parameter model 62), empirical data relating to the condenser 66, compressor 68, evaporator 70, and valve 72 (e.g., in an empirical model 60), and a parametric first-principles model 64 for the evaporation chiller block 54. From this, the parametric hybrid model 58 of the evaporation chiller block 54 will model critical parameters $\theta_k$ of the evaporation chiller block 54. These critical parameters $\theta_k$ are different from the input and output energy variables $u_k$, $y_k$ for the evaporation chiller block 54. However, they correlate with performance criteria of the evaporation chiller block 54. For example, critical parameters of the evaporation chiller block 54 may include entropy production and thermal resistance. These parameters correlate well with, but are not equal to, the input and output energy variables $u_k$, $y_k$ for the evaporation chiller block 54 (e.g., $ts^C$, $tf^C$, $f^C$, kw, $ts^E$, $tf^E$, and $f^E$).

Figure 5:
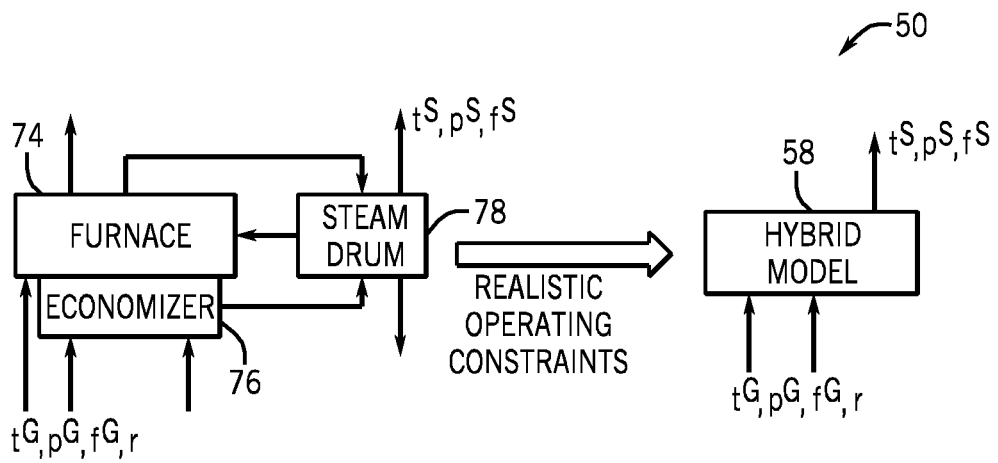
FIG. 5 is a block diagram of an exemplary boiler block of FIG. 2.

As another example, FIG. 5 is a block diagram of an exemplary boiler block 50 of FIG. 2. As illustrated, the boiler block 50 may include a furnace 74, an economizer 76, and a steam drum 78. As such, the boiler block 50 may be associated with the fuel loop 40 (e.g., the furnace 74 and the economizer 76) and the steam loop 48 (e.g., the steam drum 78). Accordingly, the variables of the fuel loop 40 and the steam loop 48 will be associated with the boiler block 50. More specifically, the variables tG, pG, fG, r, $t^S$, $p^S$, and $f^S$ comprise input and output energy variables $u_k$, $y_k$ for the boiler block 50. However, a parametric hybrid model 58 may be built that incorporates fundamental models for the furnace 74, economizer 76, and steam drum 78 (e.g., in a parameter model 62), empirical data relating to the furnace 74, economizer 76, and steam drum 78 (e.g., in an empirical model 60), and a parametric first-principles model 64 for the boiler block 50. From this, the parametric hybrid model 58 of the boiler block 50 may generate models for critical parameters $\theta_k$ of the boiler block 50. These critical parameters $\theta_k$ are different from the input and output energy variables $u_k$, $y_k$ for the boiler block 50. However, they correlate with performance criteria of the boiler block 54. For example, critical parameters of the boiler block 50 may include the efficiency of the furnace. This parameter correlates well with, but is not equal to, the input and output energy variables $u_k$, $y_k$ for the boiler block 50 (e.g., tG, pG, fG, r, $t^S$, $p^S$, and $f^S$).

Therefore, parametric hybrid models 58 can be built for various component blocks 50, 52, 54, 56 of the energy system 10. Components of the component blocks 50, 52, 54, 56 may include power generation units, such as gas turbines, wind turbines, solar panels, and so forth. As described above, an electricity grid 18 may also be considered as a power generation source, and may be modeled using the parametric hybrid models 58. Other components of the component blocks 50, 52, 54, 56 that may be modeled include chillers (e.g., such as illustrated in FIG. 4), boilers (e.g., such as illustrated in FIG. 5), cooling towers, pumps, fans, motors, thermal storage units, and so forth. In addition, parametric hybrid models 58 may be developed for loads, such as steam loads, chilled water loads, electricity loads, and so forth. Furthermore, other parametric hybrid models 58 may be developed for various power generation sources and power consumption components. In addition, not only may parametric hybrid models 58 be developed for component blocks 50, 52, 54, 56, such as those illustrated in FIG. 2, but parametric hybrid models 58 of the interconnections (e.g., the energy loops 40, 42, 44, 46, 48) between the components may also be developed.

The parametric hybrid models 58 will capture the performance and economics of the operation of the energy system 10, operational constraints of the energy system 10, existing knowledge regarding operation of the energy system 10, and objectives for the operation of the energy system 10. The optimal operating conditions of the energy system 10 may be determined via a systematic optimization problem using an appropriate solver (e.g., an algorithmic search for the best solution). However, in other embodiments, the optimal operating conditions of the energy system 10 may be determined using heuristic searches, rule-based reasoning, fuzzy logic, and so forth. Another aspect of the disclosed embodiments is the ability to modify the parameters of the parametric hybrid models 58 defining the energy system 10 based on updated data regarding new operating conditions of the energy system 10.

Various embodiments of systems and methods for applying parametric hybrid models 58 are described below. In this approach, the parametric hybrid models 58 that define the energy system 10 may be incorporated as an integrated model in a parametric hybrid model-based system manager/controller. This system may project or predict what will happen in the energy system 10 based on the integrated parametric hybrid model 58 and recent historical data including, for example, recent operating conditions and/or state values, and predictions of weather/load that may be obtained from many resources, including other parametric hybrid models 58, among other things. This projection or prediction may be updated or biased based on received current information, specified objectives, and/or constraints of the energy system 10. Optimization algorithms may be used to estimate the best current and future control adjustments on the model inputs to achieve a desired response of the energy system 10. Targets are set and the integrated parametric hybrid model outputs may be compared to how that output behaves in order to maintain the desired accuracy of the integrated parametric hybrid models 58.

As described above, parametric hybrid models 58 may be developed for any of the component blocks of a system (e.g., the component blocks 50, 52, 54, 56 of the energy system 10 described above). In addition, the parametric hybrid models 58 may be linked together to form networks of parametric hybrid models 58 that interact with each other in a plant-wide or enterprise-wide manner. As such, not only do the individual parametric hybrid models 58 model complex operation for individual component blocks of the system 10, but the interactions between the individual parametric hybrid models 58 form networks having complex data flows and constraints between the parametric hybrid models 58.

Figure 6:
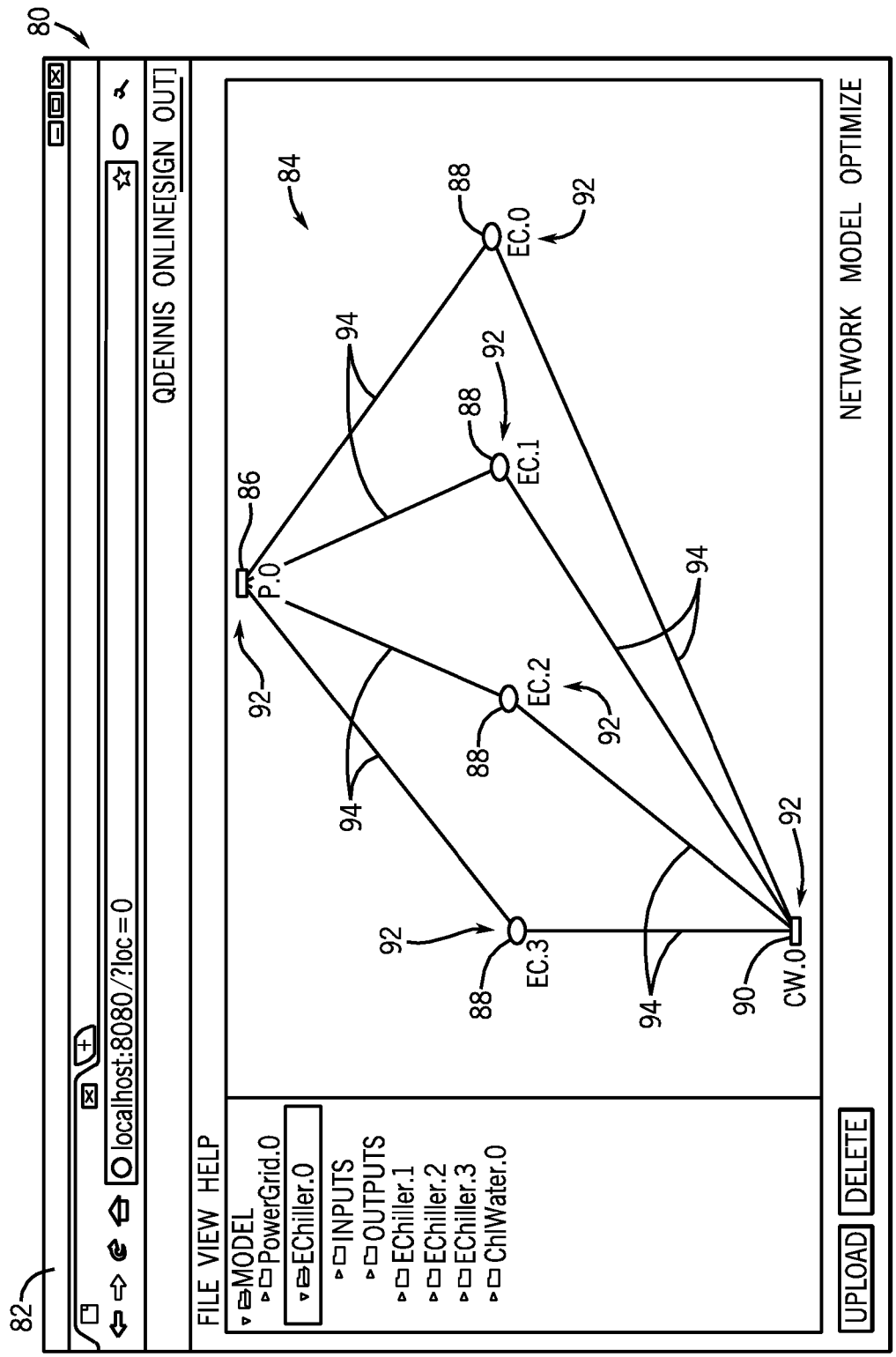
FIG. 6 is an example of a graphical user interface (i.e., a graphical representation) of a graphical modeling tool representing a plurality of parametric hybrid models relating to components of the system of FIG. 1 arranged as a network.

A graphical modeling tool may be used to define relationships and data flows between parametric hybrid models 58. More specifically, the graphical modeling tool may be configured to represent relationships between components of a system (e.g., spatial relationships between the components, fluid flows between the components, product flows between the components, power flows between the components, and so forth), wherein the components that are represented by the graphical modeling tool are modeled using the parametric hybrid models 58. For example, FIG. 6 is an example of a graphical user interface 80 (i.e., a graphical representation) of the graphical modeling tool 82 representing a plurality of parametric hybrid models 58 relating to components of the system 10 arranged as a network 84. In particular, in the illustrated example, the system 10 includes a power grid component block 86 (i.e., P.0), which functions as a power source for four chiller component blocks 88 (i.e., EC.0, EC.1, EC.2, and EC.3), and a chilled water component block 90 (i.e., CW.0), which functions as a sink for the four chiller component blocks 88. Each of the component blocks 86, 88, 90 is modeled as a parametric hybrid model 58 as described above, and is graphically represented as a node 92 that may be connected to the other nodes 92 (i.e., the other component blocks 86, 88, 90) via connections 94, which is also modeled as a parametric hybrid model.

Each of the nodes 92 relating to the component blocks 86, 88, 90 and connections 94 for the component blocks 86, 88, 90 are defined such that the exemplary network 84 in FIG. 6 unambiguously defines a well-posed optimization problem. As such, each of the nodes 92 and connections 94 are characterized by decision variables and parameters in the optimization problem. Therefore, in the graphical representation of the optimization problem, the nodes 92 capture how decision variables influence the objective functions. This distinguishes the graphical representation of the optimization problem (exemplified in network 84) from the graphical representations commonly used to simulate a process, as the connections between nodes in a simulation scenario reflect the physical impact of one node's output as input to another node. These more common input and output flows to and from the nodes 92 in the network 84 (such as the ones needed for simulating a process) are completely abstracted from the decision variables. Therefore, each of the connections 94 includes a direct translation into the optimization problem that is constructed and maintained by the graphical language. This allows the parametric hybrids models 58 and the connections 94 between the parametric hybrid models 58 to be developed by modeling experts, but the graphical components illustrated in FIG. 6 to be viewable by any users of the system 10 that have access to the graphical modeling tool 82 and are authorized to view and/or modify the parametric hybrid models 58 relating to the graphical components.

Figure 7:
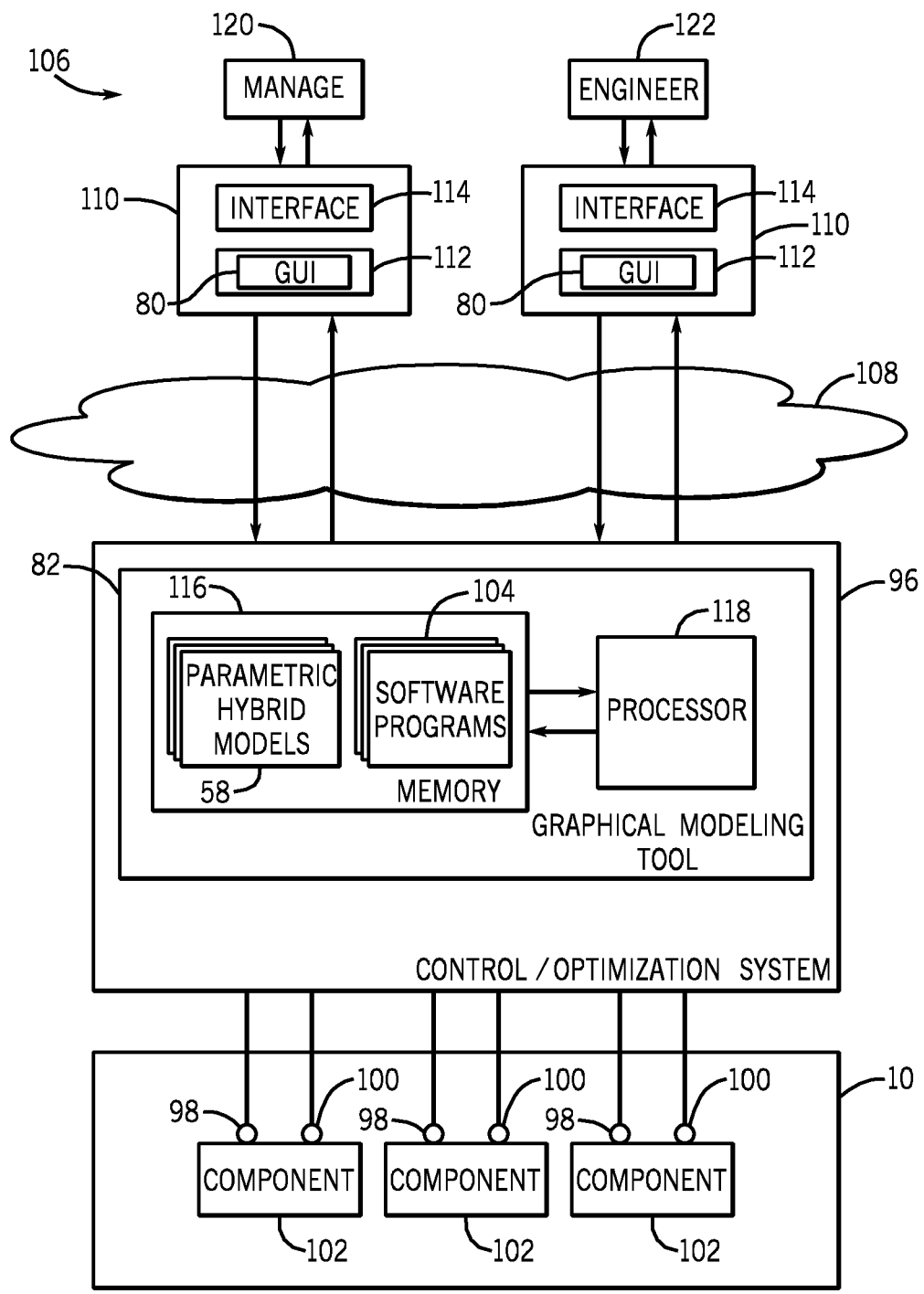
FIG. 7 is a block diagram of an enterprise-integrated parametric hybrid model enabled control system for controlling the system of FIG. 1.

FIG. 7 is a block diagram of an enterprise-integrated parametric hybrid model enabled control/optimization system 96 for controlling and optimizing the system 10 of FIG. 1. As described in greater detail below, the control/optimization system 96 includes the graphical modeling tool 82, which enables the graphical user interface 80 illustrated in FIG. 6 to be displayed to users of the control/optimization system 96. More specifically, users who have access to the control/optimization system 96 may display the graphical user interface 80 on any compatible electronic devices to interact with parametric hybrid models 58 representing components of the system 10. As illustrated in FIG. 7, the control/optimization system 96 is directly connected to the system 10. More specifically, in certain embodiments, the control/optimization system 96 may include a plurality of sensors 98 and actuators 100 that are connected to individual components 102 (i.e., physical equipment) of the system 10. Generally speaking, the sensors 98 are configured to receive signals relating to operating information of the components 102 of the system 10, and the actuators 100 are configured to receive signals transmitted by the control/optimization system 96 for controlling operation (i.e., valve settings, pump and compressor speeds, and so forth) of the components 102.

As such, the control/optimization system 96 is a computer system for controlling operation of the system 10. The control/optimization system 96 may include any of various types of computer systems or networks of computer systems, which execute software programs 104 according to various embodiments described herein. The software programs 104 may perform various aspects of modeling, prediction, optimization, and/or control of the system 10. The control/optimization system 96 may further provide an environment for making optimal decisions using an optimization solver and carrying out those decisions (e.g., to control the system 10). In particular, the control/optimization system 96 may implement parametric hybrid model control of the system 10. More specifically, the parametric hybrid models 58 relating to the components 102 of the system 10 may be utilized to enable the parametric hybrid model control of the system 10.

In addition, the control/optimization system 96 is configured to generate and transmit the graphical user interface 80 depicted in FIG. 6 to remote users 106 of the control/optimization system 96. More specifically, the control/optimization system 96 is configured to transmit graphical user interfaces 80 across a communication network 108 to electronic devices 110 that may be located remotely from the system 10. For example, in certain embodiments, the communication network 108 may include a local area network (LAN). However, the communication network 108 may also include the Internet, with the control/optimization system 96 functioning as a server to generate and transmit the graphical user interfaces 80 to electronic devices 110 located anywhere. The electronic devices 110 may be desktop computers, laptops computers, smart phones, or any other electronic devices capable of displaying the graphical user interfaces 80 on a display 112 of the electronic device 110, and capable of receiving inputs from the user 106 of the electronic device 110 via interfaces 114 of the electronic device 110. The control/optimization system 96 is designed such that potentially asynchronous inputs from local or remote users 106 are always incorporated into the online model after proper integrity checks by the parametric hybrid models 58. These integrity checks are embedded within the parametric hybrid models 58 when these models are defined.

The control/optimization system 96 includes a non-transitory memory medium 116 on which the software programs 104, data relating to the parametric hybrid models 58, operating data (both real-time and historical) for the system 10, and so forth, are stored. The term "memory medium" is intended to include various types of memory or storage, including an installation medium (e.g., a CD-ROM, or floppy disks), a computer system memory or random access memory such as DRAM, SRAM, EDO RAM, Rambus RAM, and so forth, or a non-volatile memory such as a magnetic medium (e.g., a hard drive), or optical storage. The memory medium 116 may comprise other types of memory as well, or combinations thereof. A processor 118 executing code and data from the memory medium 116 comprises a means for creating and executing the software programs 104 according to the methods described herein. The control/optimization system 96 may take various forms, including a personal computer system, mainframe computer system, workstation, network appliance, Internet appliance, or other device. In general, the term "computer system" can be broadly defined to encompass any device (or collection of devices) having the processor 118 (or processors), which executes instructions from the memory medium 116 (or memory media).

The users 106 of the control/optimization system 96 may have varying security access levels, which may be determined when the users 106 enter login credentials into the electronic devices 110, or may be determined using other methods, such as having access rights stored on the electronic devices 110, and so forth. For example, as illustrated in FIG. 7, the users 106 of the control/optimization system 96 may include manager-level users 120 and engineer-level users 122 (e.g., plant engineers or operators). As described in greater detail below, the manager-level users 120 may have access to only a subset of the features (e.g., command inputs) available to the engineer-level users 122. For example, the manager-level users 120 may be allowed to modify optimization constraints of the parametric hybrid models 58 representing the components 102 of the system 10, whereas the engineer-level users 122 may be allowed to modify optimization constraints of the parametric hybrid models 58 as well as also modifying the underlying parametric hybrid models 58. As such, the command inputs that are enabled in the graphical user interfaces 80 transmitted to the users 106 will vary depending on the security access levels of the particular users 106.

In certain embodiments, when a user 106 submits a command input (e.g., clicking on a node 92 or connection 94 to interact with the node 92 or connection 94), other users 106 of the control/optimization system 96 will be notified of the command input in substantially real-time (e.g., during operation of the system 10). In other words, the command input will be transmitted from the electronic device 110 being used by the user 106 to the control/optimization system 96, and the effect of the processed command input will be pushed out (i.e., broadcast) to other electronic devices 110 being used by other users 106. As such, the interactions that occur with the parametric hybrid models 58 will be transparent to all users 106 of the control/optimization system 96. The users 106 may also interact with the control/optimization system 96 in a sand-box mode where all the changes are understood to be local to the particular user 106 and have no impact on the online application. This sand-box mode allows each user 106 to perform what-if analysis, for example, using the most current state of the system 10 without interfering with the online application. While the simulated what-if scenarios may be recorded locally (e.g., on the electronic device 110), in certain embodiments, any commitment of changes to the control/optimization system 96 may be subject to an authorization process. For example, an engineer-level user 122 may have to approve the what-if scenarios before they are committed.

Furthermore, each model is deployed as a server service that can serve multiple requests to multiple electronic devices 110. This enables all users 106 to investigate the functioning of the parametric hybrid models 58 during operation of the system 10. More specifically, as the model is deployed and running, each node 92 (e.g., the component blocks relating to components 102 of the system 10) is capable of providing information to the users 106 via the graphical user interfaces 80. As such, the users 106 are able to view data relating to accuracy of the models during operation of the system 10. In addition, the same deployed model will be capable of providing other services, such as being used for calculating key performance indicators at the same time that it is being utilized by the control/optimization system 96.

As described above, model validation has conventionally been viewed as an offline activity. However, the embodiments described herein embed the logic for data filtering and the algorithms for parameter identification (e.g., as a closed-form solution) and optimization as properties of the deployed parametric hybrid models 58 and create the model quality measure as a parameter of the parametric hybrid models 58. More specifically, again, the graphical modeling tool 82 functions as a server service, allowing the deployed online model (i.e., the network 84 of parametric hybrid models 58) to avoid performance degradation when the model quality measure is calculated. In certain embodiments, the model quality is mapped to model parameters, such that model quality information is made available to the users 106 of the control/optimization system 96. For example, using the parametric hybrid models 58, model error may be easily associated with model parameters (e.g., by defining acceptable ranges for the parameters), and the users 106 may take specific actions in response to model quality deterioration.

The deployment strategy for the transparent parametric hybrid models 58 enables distributed and asynchronous validation and modification of the deployed model. This is particularly advantageous inasmuch as the components of the model are distributed throughout the plant and/or enterprise. In addition, the transparency is two-way. In other words, while model quality is accessible to any authorized user 106 of the control/optimization system 96, any modification by any authorized user 106 is transparent to all authorized users 106. Furthermore, the parametric nature of the model enables graphical representation of the model quality (e.g., bounds on model parameters, where the current value of the parameter falls within the bounds, and so forth).

Because the transparent parametric hybrid models 58 are composed of potentially distributed components 102 with corresponding owners and stakeholders of the components 102, the integrity of the deployed model is ensured through efficient ownership modeling. For example, model ownership (e.g., of specific parametric hybrid models 58, and so forth) is an intrinsic property of the deployed model. The ownership property for specific parametric hybrid models 58 is used as a key by which access and modification of the parametric hybrid models 58 may be authenticated and implemented. In other words, if the user 106 is not an owner of a particular parametric hybrid model 58, or does not have sufficient access rights to the parametric hybrid model 58, the user 106 may be prevented from interacting with the parametric hybrid model 58. In other words, the graphical user interface 80 presented to the user 106 via the electronic device 110 only presents the user 106 with actions (i.e., command inputs) to which the user 106 has access. The ownership property applies to both nodes 92 and connections 94 of the model network 84 for the plant and/or enterprise and, therefore, the ownership properties are used for validation of any graphical manipulation of the parametric hybrid models 58 (e.g., addition and deletion of parametric hybrid models 58 to and from the model network 84).

In addition, certain graphical manipulations (i.e., command inputs) of the parametric hybrid models 58 performed by certain users 106 may be subject to approval by other users 106 before being implemented. For example, in certain embodiments, command inputs performed by manager-level users 120 may be subject to approval by engineer-level users 122 before being implemented. This approval mechanism is enabled by the transparent nature of the graphical modeling tool 82 inasmuch as command inputs performed by any users 106 of the control/optimization system 96 are pushed to the graphical user interfaces 80 of other devices 110 connected to the control/optimization system 96 in substantially real-time.

For example, returning now to FIG. 6, the users 106 of the graphical modeling tool 82 need only interact with the graphical information via the graphical user interface 80. For example, if the user 106 wishes to add or modify a constraint of the system 10, the user 106 need only click on a node 92 or connection 94, which brings up a dialog box that enables the user 106 to add the constraint information. In addition, the users 106 of the graphical modeling tool 82 may add and/or delete component blocks from the graphical user interface 80. In other words, the component blocks represented in any given network 84 via the graphical user interface 80 need not represent all of the physical components 102 of the actual system 10 that is being modeled and optimized. Rather, the user 106 may only be interested in (or have access to) certain sets of the physical components 102 of the system 10. As such, the user 106 may personalize the graphical user interface 80 to include component blocks of interest to the user 106.

Figure 8:
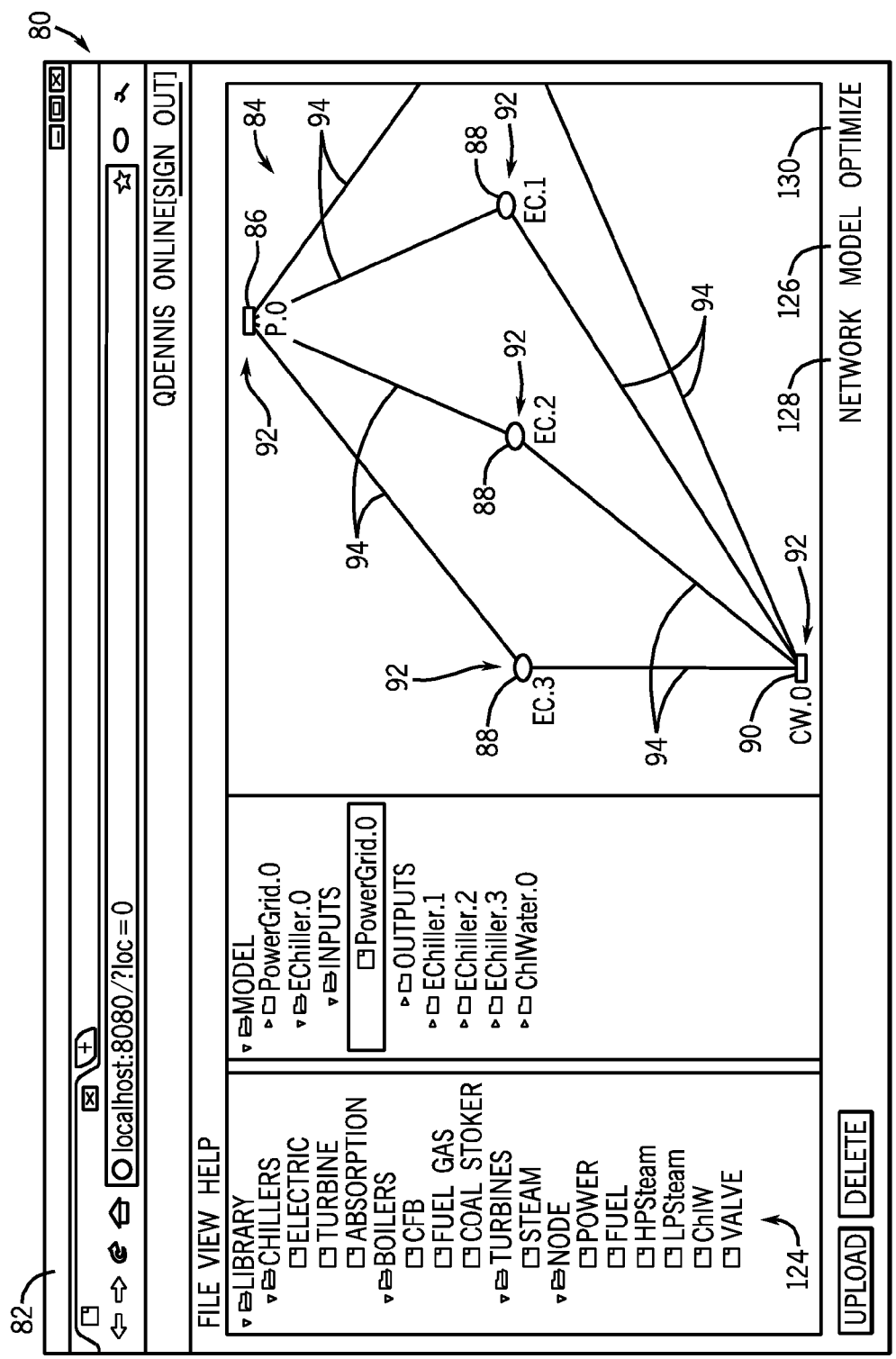
FIG. 8 is an example of the graphical user interface (i.e., a graphical representation) of the graphical modeling tool illustrating a library of component blocks available to a user.

For example, FIG. 8 is an example of the graphical user interface 80 (i.e., a graphical representation) of the graphical modeling tool 82 illustrating a library 124 of component blocks available to the user 106 to be added to the graphical user interface 80. For example, the user 106 may drag-and-drop any of the component blocks listed in the library 124 into the graphical user interface 80. In certain embodiments, the graphical modeling tool 82 will automatically create and/or remove the appropriate connections 94 between component blocks (i.e., the nodes 92) that are added and/or deleted by the user 106 via the graphical user interface 80 being viewed by the user 106. In addition, it will be understood that the settings of the personalized graphical user interfaces 80 created by the users 106 may be saved and re-opened as needed.

As such, any particular graphical representation of the system 10 may convey different information to the user 106 depending on the context in which the graphical representation is involved. For example, if a Model tab 126 of the graphical modeling tool 82 is selected by the user 106, and a connection 94 between one of the four chiller component blocks 88 (i.e., EC.0, EC.1, EC.2, and EC.3) and the chilled water component block 90 is clicked, a dialog box may be initiated, displaying the flow rate, temperature, and pressure of the chilled water leaving the chiller component block 88, for example. However, if an Network tab 128 of the graphical modeling tool 82 is selected by the user (assuming the user has access to the Network tab 128), and the connection 94 between the chiller component block 88 and the chilled water component block 90 is clicked, a dialog box may be initiated, displaying the chilled water tonnage produced by the chiller component block 88, for example.

In other words, the decision variables or constraints (e.g., parameters) of the parametric hybrid models 58 representing the component blocks are accessible to users 106 when the Network tab 128 is selected (i.e., when in Network mode). However, the actual physical inputs and outputs that describe the particular equipment are not displayed when the Network tab 128 is selected (i.e., when in Network mode). Rather, the actual physical inputs and outputs that describe the particular equipment are only displayed to the user when the Model tab 126 is selected (i.e., when in Modeling or Operation mode). As such, in certain embodiments, only the users 106 (e.g., the engineer-level users 122) having the in-depth knowledge of the parametric hybrid models 58 representing the component blocks may have access to the Model tab 126. Therefore, only these users 106 will be capable of interacting with the actual physical inputs and outputs of the particular equipment. Conversely, any users 106 of the system 10 that have access to the Network tab 128 may be capable of interacting with the decision variables of constraints of the system 10 for the purpose of performing optimization and control of the system 10.

Each node 92 in a network 84 can represent an objective function for optimization and control of the system 10. This can be particularly beneficial if multiple operational objectives are to be handled graphically via the graphical user interface 80. Various objectives may be capable of being interacted with via the graphical user interface 80 and, as such, the user 106 may graphically modify the optimization problem for the system 10. For example, in certain embodiments, the graphical modeling tool 82 may present the user 106 with a range of values within which an optimization constraint for a particular parametric hybrid model 58 may be modified. In other words, without requiring approval by engineer-level users 122, the graphical user interface 80 may allow a manager-level user 120 to modify an optimization constraint within a bounded range of feasible values for control of the system 10.

Any and all command inputs submitted by the users 106 may redefine the optimization objectives for the system 10. For example, a chiller network (e.g., the network 84 illustrated in FIGS. 6 and 8) receiving electric energy and producing chilled water may be optimized to produce a chilled water load with minimal energy use, or to maximize the chilled water production given a maximum available electric energy, through command inputs submitted via the graphical user interface 80 by the user 106. For example, when an Optimization tab 130 is selected, the user 106 may interact with optimization constraints of the network 84.

Figure 9:
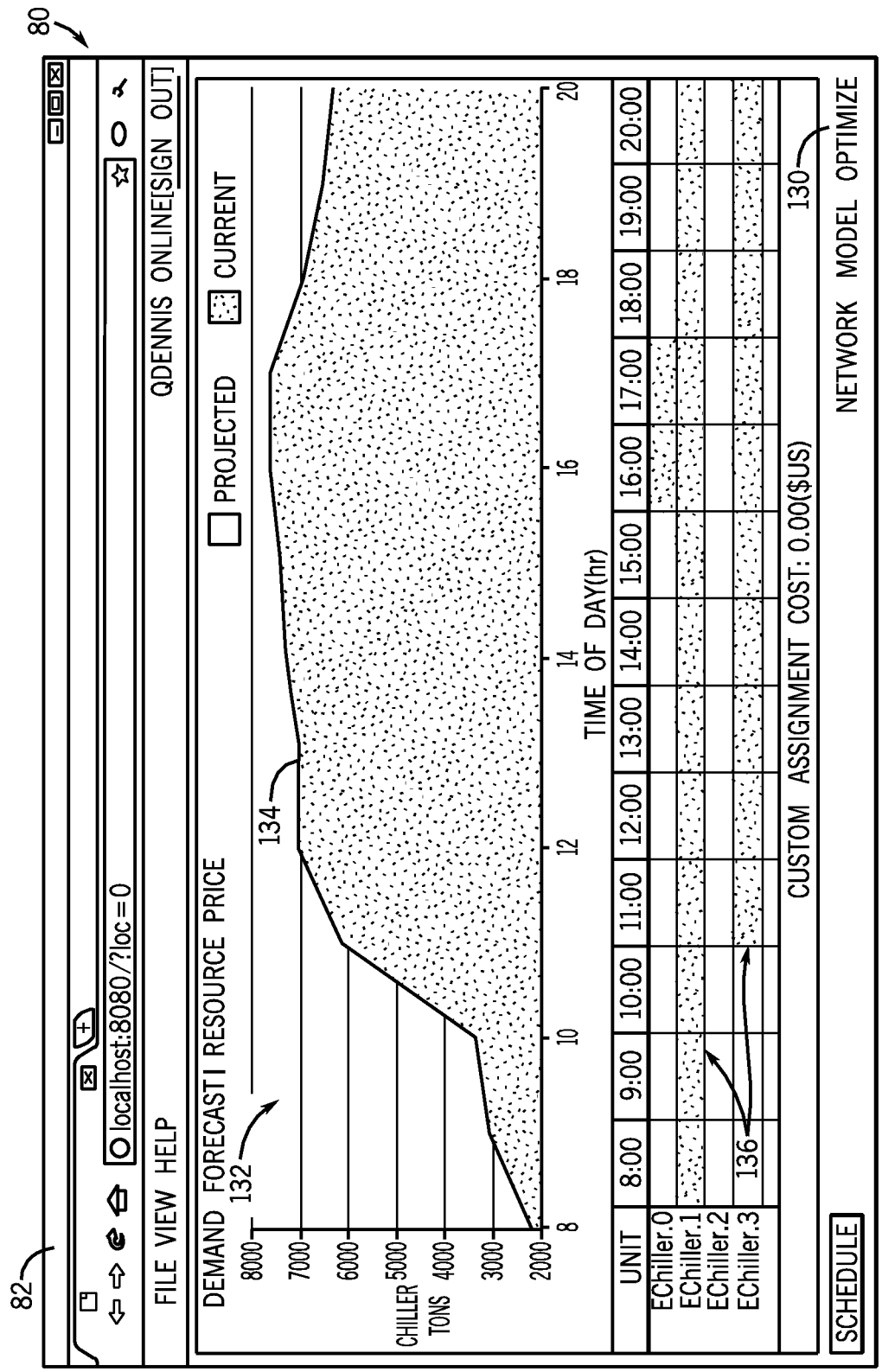
FIG. 9 is an example of the graphical user interface (i.e., a graphical representation) of the graphical modeling tool illustrating an optimization view when an Optimization tab is selected by the user.

For example, FIG. 9 is an example of the graphical user interface 80 (i.e., a graphical representation) of the graphical modeling tool 82 illustrating an optimization view 132 when the Optimization tab 130 is selected by the user 106. More specifically, with the Optimization tab 130 selected, FIG. 9 illustrates when the user 106 clicks the chilled water component block 90. As such, the optimization view 132 depicted in FIG. 9 illustrates a time series 134 of the projected chilled water demand of the chilled water component block 90. In addition, the optimization view 132 for the chilled water component block 90 includes time schedules 136 for each of the four chiller component blocks 88 that are connected to the chilled water component block 90. More specifically, the time schedules depict when each of the chiller component blocks 88 are scheduled to be operative to achieve the projected chilled water demand of the chilled water component block 90.

Figure 10:
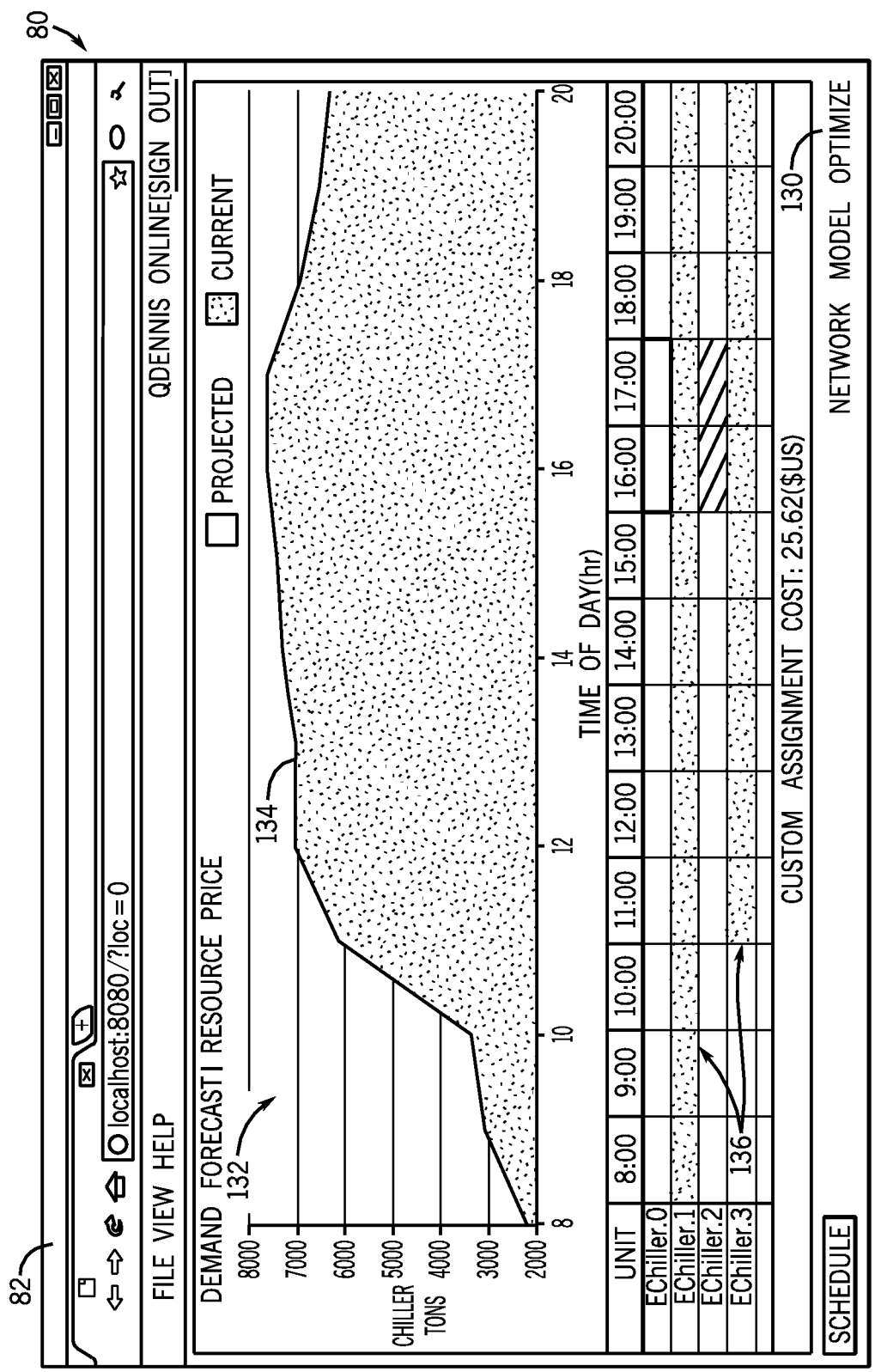
FIG. 10 is an example of the graphical user interface (i.e., a graphical representation) of the graphical modeling tool illustrating the optimization view when the user has submitted a command input and the optimization solution of the system of FIG. 1 has been updated.

Assuming the user 106 is authorized to interact with the chilled water component block 90, the user 106 may modify an optimization constraint of the chilled water component block 90 via the optimization view 132 of the graphical user interface 80. For example, FIG. 10 is an example of the graphical user interface 80 (i.e., a graphical representation) of the graphical modeling tool 82 illustrating the optimization view 132 when the user 106 has submitted a command input (i.e., modified an optimization constraint) and the optimization solution of the system 10 has been updated. More specifically, in the example depicted in FIG. 10, the user 106 has modified the time series 134 of the projected chilled water demand of the chilled water component block 90, and the time schedules 136 of the four chiller component blocks 88 have been updated. In particular, the model of the control/optimization system 96 has updated the optimization problem of the system 10 to determine that chiller component block EC.0 should be turned off between 16:00 and 18:00 and that chiller component block EC.2 should be turned on between 16:00 and 18:00. As illustrated in FIG. 10, a cost of the committed modification is presented to the user 106 (e.g., at the bottom of the graphical user interface 80). In certain embodiments, the cost of introducing the optimization constraints may be reported to all users 106, and recorded in appropriate formats (e.g., in a database residing within the control/optimization system 96, for example). This type of modification of optimization constraints may be performed for any of the component blocks (i.e., parametric hybrid models 58) of the network 84 displayed by the graphical user interface 80. Due to the global optimization strategy in the control/optimization system 96, the cost of respecting newly defined constraints by the user 106 is calculated and shown immediately to the user as shown in FIG. 10. The ability to graphically vary the load profile (e.g., time series 134) and immediately see the costs/savings under various load profiles is a unique capability enabled by the graphical language for optimization presented herein.

The components blocks are parametric hybrid models 58 and, as such, are not linear models in general (even though linear models are degenerate forms of parametric hybrid models 58). Therefore, the networks 84 comprised of the parametric hybrid models 58 are similarly not going to be linear optimization problems. Accordingly, when a user 106 modifies an optimization constraint of a parametric hybrid model 58, the determination of a well-posed modified optimization problem is somewhat complex. A preferred method for determining the modified optimization problem for the graphical optimization language is to use a data-driven convex approximation over a trajectory for each parametric hybrid model 58 in the network model 84. By definition, a function $f$ is convex if:

$$f(\lambda x+(1-\lambda)y) \leq \lambda f(x)-(1-\lambda)\theta(y),$$

$$\forall x,y, \in D_f, \forall \lambda \in [0,1]$$

Furthermore, if $f$ and $g$ are convex functions, then so is:

$$\alpha f + \beta g,$$

$$\forall \alpha, \beta \geq 0$$

As a result, the overall model representing the network model 84 will be convex. Any local minimum of a convex function is also a global minimum. Non-convex optimization problems benefit from tight, convex underestimators. Assuming that $f$ is a twice differentiable function, then $f$ is convex if and only if:

$$\nabla^2 f(x) \succ 0,$$

$$\forall x \in D_f$$

Figure 11:
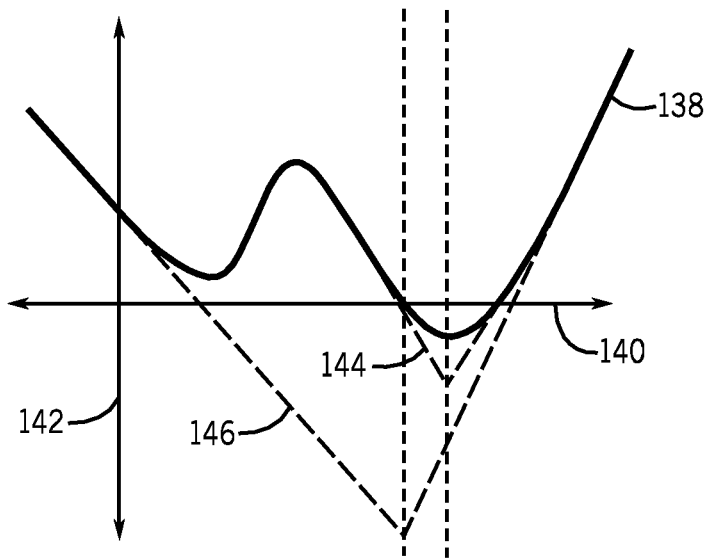
FIG. 11 is an example of a non-linear and non-convex optimization problem and two convex approximations for the problem.

In the graphical representation of the optimization problem (e.g. the network model 84 shown in FIG. 8), each node 92 exposes decision variables for the optimization problem. Each connection 94 determines how decision variables in two nodes 92 are related (e.g., constrained). Therefore, the graphical presentation has a direct translation into the optimization problem statement. Network topology, and any modification to the network topology via graphical interactions with the network 84 (e.g. adding a node 92, removing a connection 94), can be captured by linear matrix operations. Therefore, a graphical representation of the optimization problem will translate into a well-posed optimization problem if each component in the network 84 is approximated with a convex function. A preferred method for this convexification in the graphical language disclosed herein is to use automatic data-driven convex approximation of the network components along a predicted operation trajectory. The parametric hybrid modeling paradigm allows for this convex approximation with desired degrees of accuracy. Therefore, the optimization problem for the model of the system 10 may be solved using convex approximation where successive convexification of feasible regions may be performed, with iteration confined to the feasible regions. For example, FIG. 11 is an example of a non-linear and non-convex function 138 of two variables 140, 142 relative to each other. As illustrated, two convex approximations 144, 146 provide convex underapproximators with different accuracies.

In addition, in certain embodiments, the solution to the optimization problem 138 is not ascertained in a deterministic manner. In other words, the optimization solution is not determined independent of the point at which the determination is begun. Rather, the optimization solution may be determined with the previous optimization solution in mind. For example, returning to the example of the modification of the optimization constraint described with respect to FIG. 10, the updating of the optimization solution between 16:00 and 18:00 begins under the assumption that operating chiller component block EC.0, chiller component block EC.1, and chiller component block EC.3 during this time period is the optimal solution. As such, the modified optimization solution merely changes the scheduling times 136 such that chiller component block EC.2 instead of chiller component block EC.0 is operated during this time period. In other words, the model attempts to reach an optimization solution as close to the previous optimization solution as possible (i.e., in a non-deterministic manner).

As an example, the scheduling problem formulation may be defined by the following functions:

$$\min \sum_{i \in M} \beta_i f_i + \sum_{i \in M} \sigma_i g_i + \sum_{j \in N} \kappa_j r_j,$$

such that $p_i = \Gamma_i(A_i p, B_i r; \phi_i) \ \forall i \in M$ $f + Hp - g = 0$ $Zp \geq \delta$ $\mu_i y_i \leq p_i \leq \xi_i y_i \ \forall i \in M$ $y_i \in \{0,1\} \ \forall i \in M$ where M is the set of unit operations, N is the set of inputs, $\beta$, $\sigma$, and $\kappa$ are costs associated with import of a product, sale of a product, and purchase of a resource, respectively, r is a given resource input, p is product generated by a specific unit operation, A and B restrict unit operation models, $\Gamma$, to a subset of products and inputs, $\phi$ is the set of fitting parameters for a given model, $\mu$ and $\xi$ are unit operation bounds, H, $f$, and g allow product import and export, Z and $\delta$ set demand requirements, and y is a binary variable for unit status. The linear network model constraints H and Z may be defined by the user 106 (e.g., by clicking on a parametric hybrid model 58 via the graphical user interface 80). In addition, the discrete (or binary) decision variables $y_i$ may also be defined by the user 106. Furthermore, the constraint parameters $\delta$, $f$, g, $\beta$, $\sigma$, and $\kappa$ may also be defined by the user 106.

Figure 12:
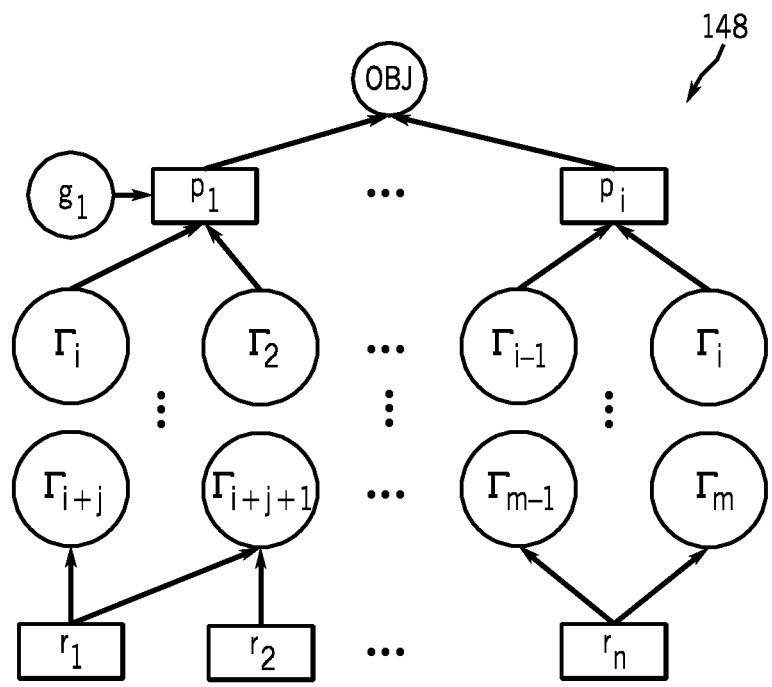
FIG. 12 is an example of a solution graph for optimization solution equations using the parametric hybrid models.

FIG. 12 is an example of a solution graph 148 for the optimization solution equations described above. The solution graph 148 may be referred to as a directed tree D=(V, E), where V is the set of unit operation models, products, and resources V=(F, p, r, f, g) and E is the set of connections E=(H, Z). In general, the set of unit operation models V is analogous to the parametric hybrid models 58 (i.e., the nodes 92 of the model network 84) and E is analogous to the connections 94 of the model network 84. FIG. 12 clearly demonstrates that with nonlinear unit operation models, $\Gamma$, the well-posedness of the optimization problem is not trivial, and graphical manipulation of the solution graph is not easily manageable. Successive data-driven convexification is the preferred approach to render such solution graph graphically manageable.

Figure 13:
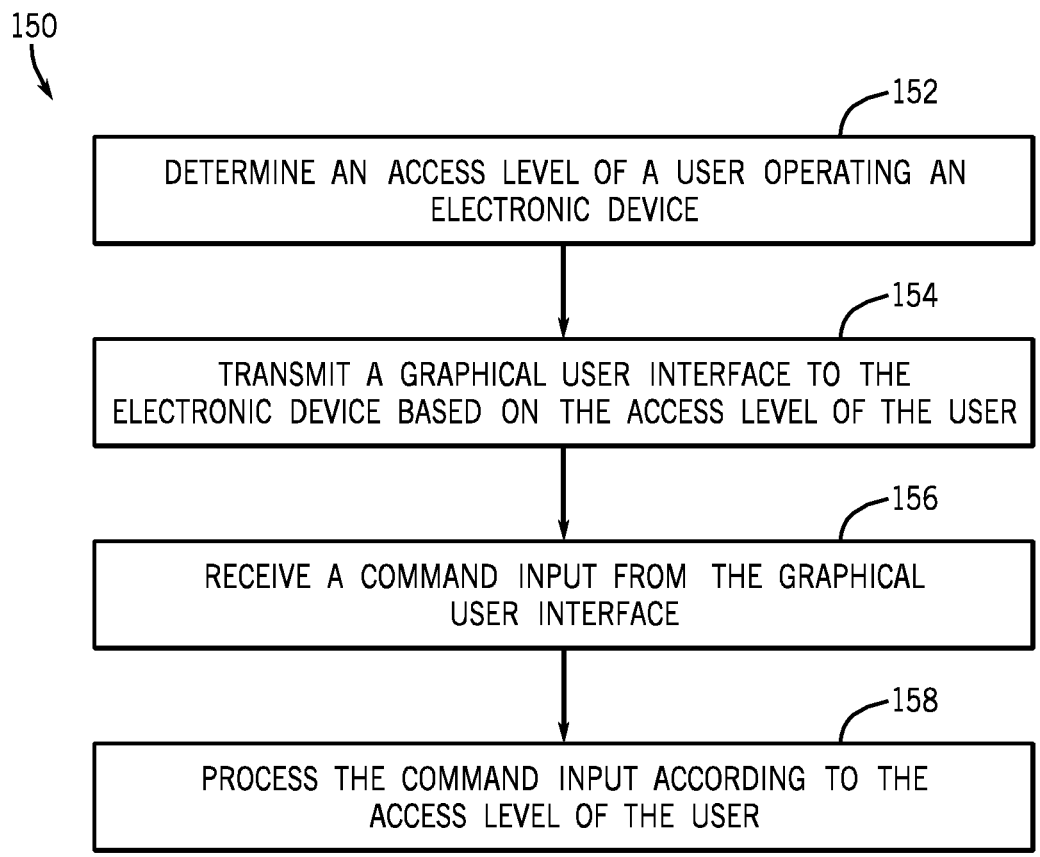
FIG. 13 is an example of a method for utilizing the graphical user interface to interact with the parametric hybrid models.

FIG. 13 is an example of a method 150 for utilizing the graphical user interface 80 to interact with the parametric hybrid models 58 described herein. In step 152, an access level of a user 106 may be determined when the user 106 enters login credentials into a remote electronic device 110, or may be determined using other methods, such as having access rights stored on the electronic device 110, and so forth. For example, as described above, when the user 106 logs into the electronic device 110, the graphical modeling tool 82 may determine that the user 106 is a manager-level user 120 or an engineer-level user 122. However, other access levels may be used, which may enable a more granular level of authorization and functionality.

In step 154, the graphical user interface 80 is made available from the graphical modeling tool 82 of the control/optimization system 96 to the electronic device 110. The graphical user interface 80 enables a plurality of command inputs relating to the parametric hybrid models 58 (i.e., which relate to actual physical components of a plant and/or enterprise) of a model network 84, and corresponding to the access level of the user 106. For example, assuming the user 106 has appropriate access rights to a particular parametric hybrid model 58, a command input for modifying an optimization constraint (e.g., a predicted load profile) for the parametric hybrid model 58 may be enabled via the graphical user interface 80. In addition, again assuming the user 106 has appropriate access rights to the particular parametric hybrid model 58, a command input for modifying how the parametric hybrid model 58 functions (e.g., the inputs, outputs, parameters, and so forth, of the parametric hybrid model 58) may be enabled via the graphical user interface 80.

Furthermore, as described in greater detail above, the graphical user interface 80 enables the display of a plurality of parametric hybrid models 58 represented as nodes 92 of a model network 84, and a plurality of inputs and outputs of the plurality of parametric hybrid models 58 represented as connections 94 between the nodes 92 of the model network 84. The graphical user interface 80 enables the user 106 to add or delete nodes 92 and connections 94 from the model network 84 to create a personalized display of the parametric hybrid models 58 with which the user 106 is authorized to interact.

In step 156, a command input is received from the graphical user interface 80 by the graphical modeling tool 82 of the control/optimization system 96. As described above, in certain embodiments, the command input may be transmitted (i.e., broadcast) to other users 106 of the control/optimization system 96 via other electronic devices 110. Then, in step 158, the command input is processed by the graphical modeling tool 82 according to the access level of the user 106 submitting the command input. For example, in certain embodiments, a model quality of one or more of the parametric hybrid models 58 may be determined during operation of the system 10. As described above, the ability to interrogate model quality during operation of the system 10 is due to the transparent nature of the graphical modeling tool 82. In addition, in certain embodiments, the optimization problem of the model network 84 may be automatically re-adjusted by the control/optimization system 96 during operation of the system 10, assuming the user 106 has authorization to make such a request, and that the request is feasible. However, in certain embodiments, the command input may also be subject to approval by an engineer-level user 122, subject to bounding constraints (e.g., only changes within specific ranges may be allowed), and so forth, prior to execution by the control/optimization system 96.

Regardless, the command inputs may all be used to modify control of the system 10 during operation of the system 10 via the control/optimization system 96. For example, using the example described above with respect to FIG. 10, if a user modifies an optimization constraint of one of the parametric hybrid models 58, and the modification is found to be feasible by the control/optimization system 96 (i.e., via the graphical modeling tool 82), then the resulting optimization solution may be automatically implemented by the control/optimization system 96. For example, actuators 100 of the components 102 of the system 10 may be actuated in accordance to the revised optimization solution. Again, using the example described with respect to FIG. 10, the control/optimization system 96 may automatically control the system 10 to shut down chiller component block EC.0 between 16:00 and 18:00, and to start up chiller component block EC.2 between 16:00 and 18:00.

Figure 14:
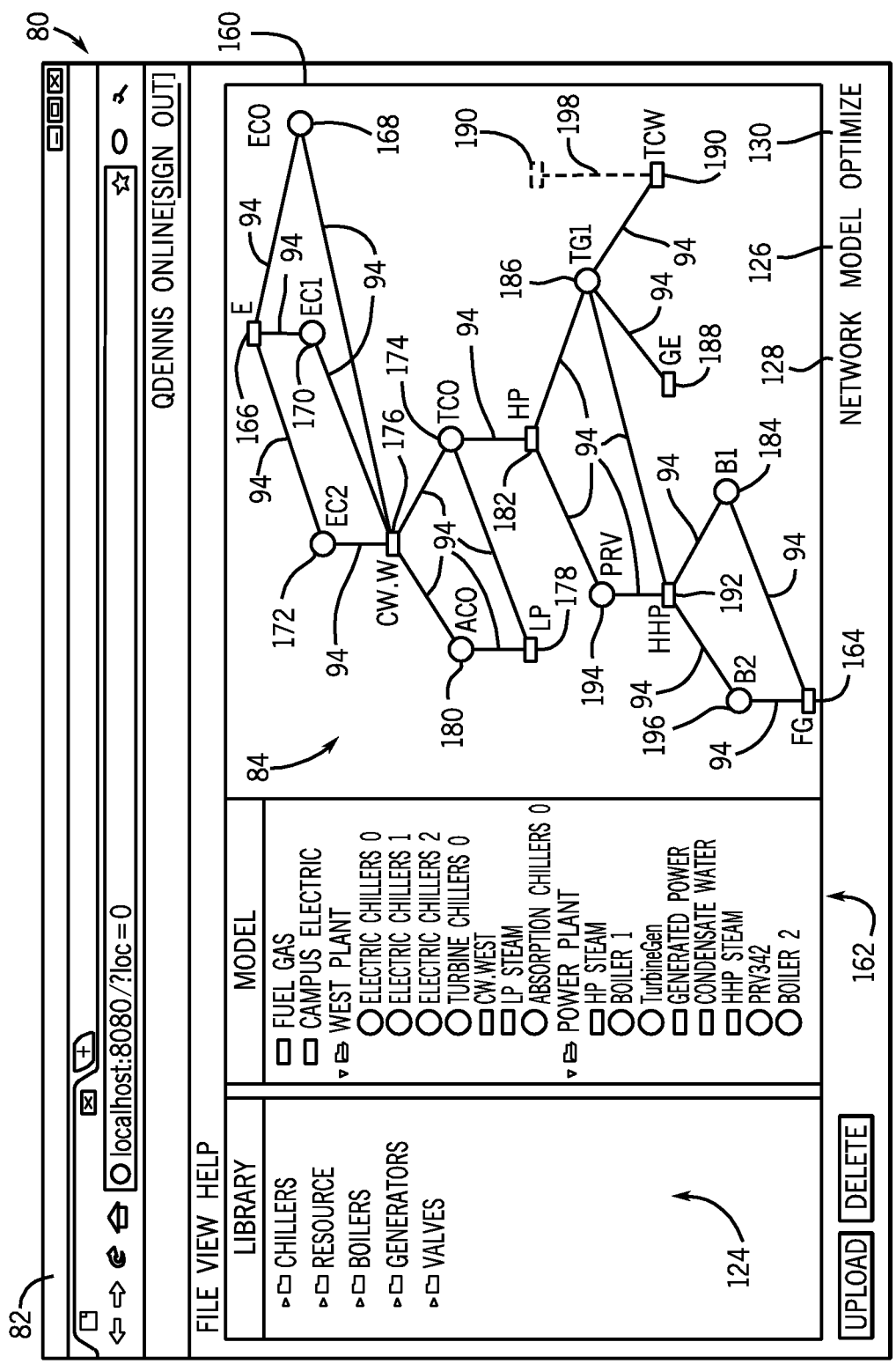
FIG. 14 is an example of the graphical user interface of the graphical modeling tool illustrating a model network being optimized based on a first node.

Returning now to FIG. 8, in certain embodiments, the nodes 92 of the model network 84 may be selected via the graphical user interface 80 and, upon selection, the graphical representation of the model network 84 that is depicted by the graphical user interface 80 may be re-organized (e.g., rearranged) based on the selection. For example, FIG. 14 is an example of the graphical user interface 80 (i.e., a graphical representation) of the graphical modeling tool 82 illustrating a particular model network 84 being illustrated in the network model pane 160 of the graphical user interface 80. In the example illustrated in FIG. 14, the network model 84 includes 17 nodes 92 in total. More specifically, as illustrated in the model pane 162 of the graphical user interface 80, the model network 84 includes a "FUEL GAS" node 164, a "CAMPUS ELECTRIC" node 166, seven nodes 92 associated with a "WEST PLANT" (i.e., an "ELECTRIC CHILLERS 0" node 168, an "ELECTRIC CHILLERS 1" node 170, an "ELECTRIC CHILLERS 2" node 172, a "TURBINE CHILLERS 0" node 174, a "CW.WEST" (chilled water) node 176, an "LP STEAM" node 178, and an "ABSORPTION CHILLERS 0" node 180), and eight nodes 92 associated with a "POWER PLANT" (i.e., an "HP STEAM" node 182, a "BOILER 1" node 184, a "TurbineGen" node 186, a "GENERATED POWER" node 188, a "CONDENSATE WATER" node 190, an "HHP STEAM" node 192, a "PRV342" node 194, and a "BOILER 2" node 196).

Any one of these nodes 92 of the model network 84 may be selected by the user in order to graphically rearrange the location and orientation of the graphical positioning of the nodes 92 and connections 94 of the model network 84 and/or change an associated optimization order of the nodes 92 of the model network 84. For example, FIG. 14 illustrates the depicted model network as being optimized for electricity usage of the model network 84. As such, the "CAMPUS ELECTRIC" node 166 is illustrated at the top of the graphical representation of the model network 84. Not only is this node 166 graphically represented as being at the "top" of the model network 84, the selection of this node 166 adjusts the underlying optimization prioritizations of the model network 84. More specifically, in certain embodiments, selecting the "CAMPUS ELECTRIC" node 166 in this manner sets the electricity usage of this node to be the top priority for the model network 84. It will be understood that, in certain embodiments, energy usage associated with the particular selected node 92 may be optimized upon selection of the node 92 and, in other embodiments, energy usage of all nodes 92 associated with the energy type (e.g., electricity usage in this example) of the selected node 92 may be optimized upon selection of the node 92.

Figure 15:
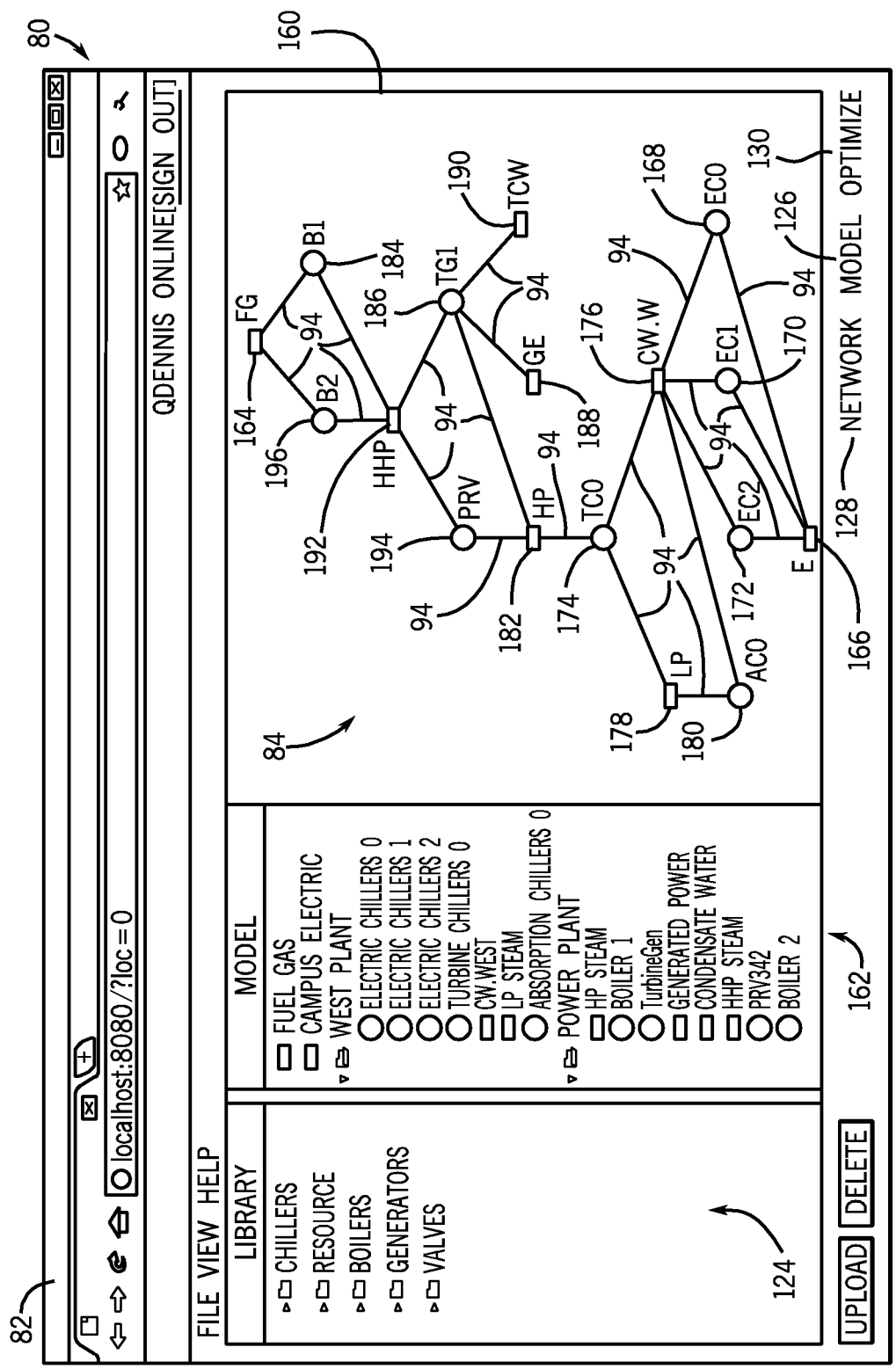
FIG. 15 is an example of the graphical user interface of the graphical modeling tool illustrating the model network of FIG. 14 being optimized based on a second node that has been selected by a user.

Selecting another node 92 of the model network 84 may cause the graphical representation of the model network 84 to change, as well as re-prioritize the newly selected node 92. For example, FIG. 15 is an example of the graphical user interface 80 (i.e., a graphical representation) of the graphical modeling tool 82 illustrating the model network 84 of FIG. 14, wherein the "FUEL GAS" node 164 has been selected as the prioritized node. As illustrated in FIG. 15, the positioning of the nodes 92 of the model network 84 within the network model pane 160 of the graphical user interface 80 has been changed in response to the selection of the "FUEL GAS" node 164. In addition, the positioning of all of the nodes 92 and the associated connections 94 will transition from what is illustrated in FIG. 14 to what is illustrated in FIG. 15 in real-time with an associated animation of the movements of each of the nodes 92 and connections 94 from their graphical positioning in FIG. 14 to their graphical positioning in FIG. 15. For example, the graphical position of the "CONDENSATE WATER" node 190 from FIG. 15 is illustrated in FIG. 14 in dashed lines. The transition trajectory 198 from the graphical position of the "CONDENSATE WATER" node 190 illustrated in FIG. 14 to the graphical position of the "CONDENSATE WATER" node 190 illustrated in FIG. 15 is illustrated in FIG. 14 as well. Again, as the graphical positioning of the "CONDENSATE WATER" node 190 transitions from these two positions, the movement of the "CONDENSATE WATER" node 190 will be animated in real-time along the transition trajectory 198. As such, the "CONDENSATE WATER" node 190 will seemingly move along the transition trajectory 198 from the graphical position of FIG. 14 to the graphical position of FIG. 15.

In addition, all of the other nodes 92 and connections 94 will also transition in a similar manner. It will be understood that the connections 94 will not simply translate from their graphical position in FIG. 14 to their graphical position of FIG. 15. Rather, the end points (i.e., connected to the respective nodes 92) of each of the respective connections 94 will translate, and the graphical line that represents the respective connection 94 will translate, rotate, and change length, as necessary, such that the associated end points (i.e., connected to the respective nodes 92) are graphically maintained.

As described above, not only will selection of a particular node 92 lead to graphical re-organization of all of the nodes 92 and connections 94 of the model network 84, but the underlying optimization solutions may be adjusted as well. For example, while electricity usage is optimized in FIG. 14, fuel gas usage will become optimized once the "FUEL GAS" node 164 is selected (i.e., FIG. 15). In other words, the prioritization of optimization will shift from electricity usage in FIG. 14 to fuel gas usage in FIG. 15. The selection of the nodes 92 that will initiate the re-organization of the nodes 92 and the connections 94 as illustrated in FIGS. 14 and 15 will vary in certain embodiments. For example, in certain embodiments, the re-organization of nodes 92 and connections 94 may be initiated by a user double-clicking a mouse button, clicking a right mouse button, and so forth, while a cursor is hovering over the particular node 94 in the network model pane 160 of the graphical user interface 80.

In addition to the user-based security of the parametric hybrid models 58 described above, an overall framework for securing proprietary (e.g., protected) information relating to the parametric hybrid models 58 may also be implemented. In particular, the embodiments described herein include a workable model-based optimization and control system with secure models. The embodiments described herein overcome certain challenges preventing the use of content-protected models in model-based optimization and control applications. For example, one challenge includes the absence of a general theory for efficiently approximating complex dynamic models. Without the ability to guarantee a desired accuracy level, conventional model-based optimization and control solutions typically rely on the most comprehensive representation of the system for numerical computations. In addition, online optimization is generally a relatively computationally expensive exercise. The addition of an online approximation capability only adds to the online computation cost. This has been perceived a formidable cost and, hence, real-time model approximation has not been previously attempted in optimization solutions in which explicit optimization is carried out.

In addition, the need to use a model over a prediction horizon further complicates real-time model approximation. Conventional model-based optimization and control solutions typically solve a constrained optimization problem over a horizon of interest (e.g., also known as prediction horizon, control horizon, or planning horizon). Online approximation of a model over a future horizon only adds further complexity to the online computations for optimization.

Furthermore, the need for distributed optimization further increases the cost of online computations. The need for distributed optimization (e.g., in which a single model is needed by more than one solver) in problems of realistic complexity has further discouraged any attempt to try to approximate the model online in conventional systems. The embodiments described herein address this shortcoming by the deployment of models as servers, enabling a reasonable option to allow distributed optimization. The possibility of deploying models in the cloud has the potential to reduce the computational cost of a distributed deployment.

In addition, in a plant-wide/enterprise-wide optimization, there is often a concern when having a network composed of a large number of unit models, complex network connectivity, and a dynamic set of operational conditions/constraint/objectives. The information used to maintain this problem formulation up-to-date typically is obtained from sources that are distributed throughout the enterprise, and often function with local autonomy. Reliable access to such a large set of measurements/data from a plant floor in a manner that online optimization may be carried out with confidence is generally perceived as a challenge.

Figure 16:
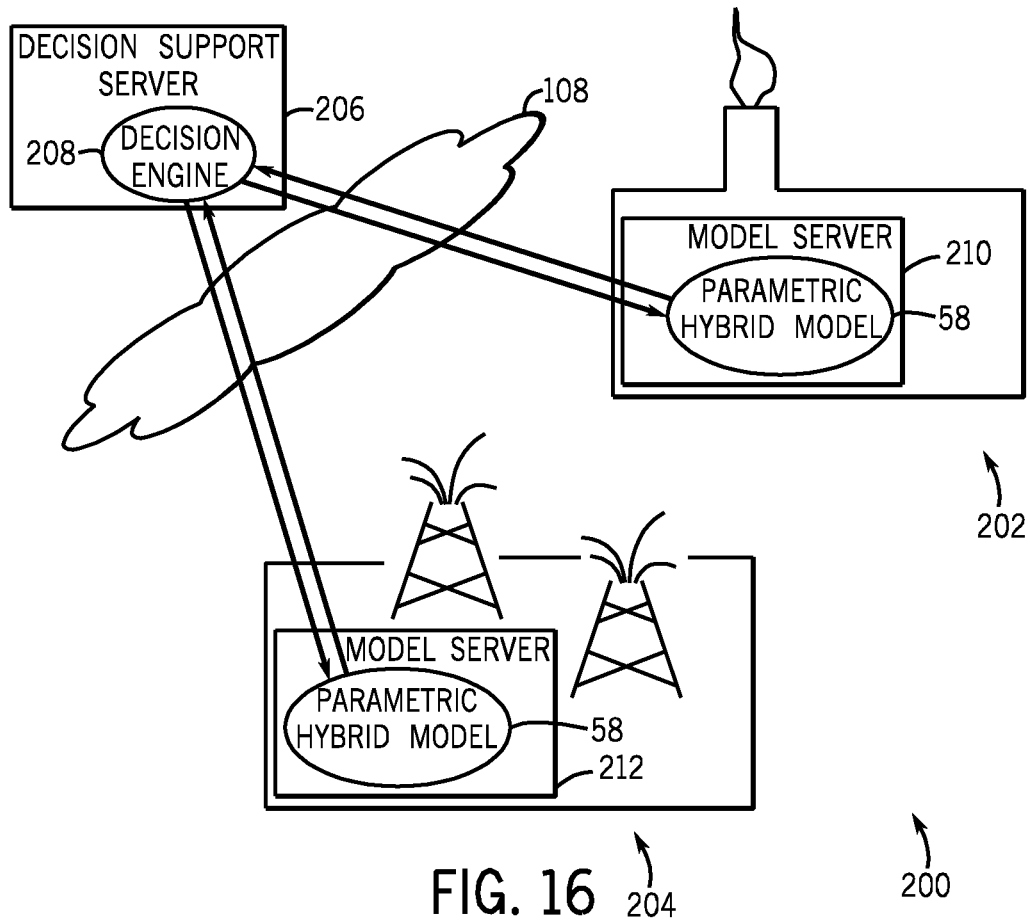
FIG. 16 is a block diagram of a distributed enterprise-integrated parametric hybrid model enabled control/optimization system.

The embodiments described herein address these above-mentioned challenges. In particular, the embodiments described herein enable the use of distributed parametric hybrid models 58 that are capable of securing proprietary (e.g., protected) information. FIG. 16 is a block diagram of a distributed enterprise-integrated parametric hybrid model enabled control/optimization system 200. The distributed control/optimization system 200 illustrated in FIG. 16 is somewhat similar to the control system illustrated in FIG. 7 and described in greater detail above. However, as illustrated in FIG. 16, in the distributed control/optimization system 200, the control/optimization system 96 is distributed among several facilities 202, 204. Although illustrated in FIG. 16 as including only two facilities 202, 204 (e.g., a manufacturing facility 202 and an oil and gas facility 204), it will be appreciated that any number of distributed facilities may communicate with a centralized decision support server 206, which includes a decision engine 208 that communicates via the communication network 108 with a plurality of secure parametric hybrid models 58, each of which is located at a facility 202, 204.

As will be appreciated, the centralized decision support server 206 includes any suitable server hardware (e.g., including memory, processors, and so forth, as described above with respect to the control/optimization system 96) capable of hosting the decision engine 208, which is software configured to communicate via the communication network 108 with the distributed parametric hybrid models 58. Similarly, it will be appreciated that the parametric hybrid models 58 that are located at or near their respective facilities 202, 204 will be stored on memory media of model servers 210, 212 physically located at the respective facilities 202, 204. As such, it will be further appreciated that the model servers 210, 212 include any suitable server hardware (e.g., including memory, processors, and so forth, as described above with respect to the control/optimization system 96) capable of hosting the parametric hybrid models 58 (e.g., storing instantiated instances of parametric hybrid model objects that include the parametric hybrid models 58), each of which are capable of functioning as servers for communicating back to the decision engine 208, among other locations, as well as communicating among each other. Again, it should be noted that while the embodiments described herein are primarily described at utilizing parametric hybrid models 58, in other embodiments, other types of model objects that include models of a plant or process being controlled may function as secure model-based server objects as described herein.

Figure 17:
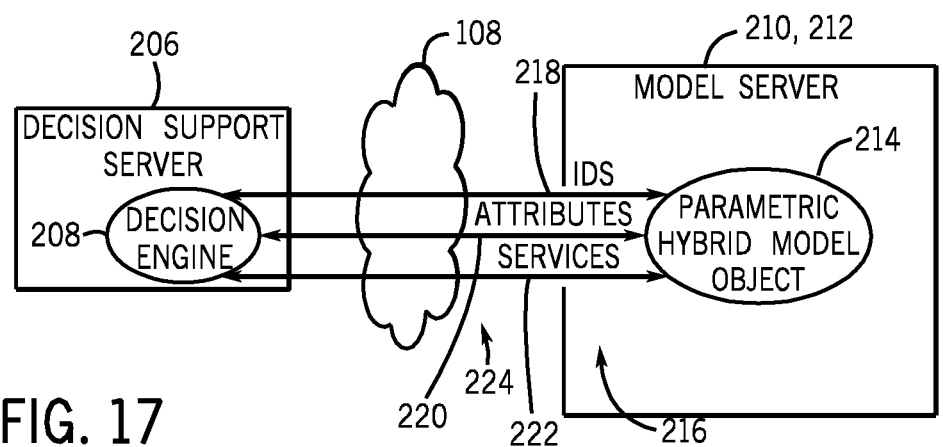
FIG. 17 is a block diagram of the interfaces of parametric hybrid model objects and associated protocol that is used to communicate between a decision engine and the parametric hybrid model objects.

As illustrated in FIG. 17, each parametric hybrid model 58 (or other type of model) may be an instantiated software object 214 resident in memory on its respective model server 210, 212, and may include a software interface structure 216 (e.g., IDs 218, attributes 220, services 222, and so forth) configured to communicate with the centralized decision engine 208 (as well as other devices, software objects, and so forth, communicatively coupled to the communication network 108) via a predetermined communication protocol 224. As will be appreciated, in certain embodiments, the communication protocol 224 may be an extension of an existing communication protocol, such as TCP/IP, DeviceNet, Profibus, and so forth, and may define the messages that are capable of being communicated and understood via devices, software objects, and so forth, that are communicating across the communication protocol 224, the types of responses that may be transmitted across the communication network 108, how to handle inappropriate communications across the communication network 108, and so forth. As such, the communication protocol 224 that is used will be specifically designed to facilitate the communication of information relating to the parametric hybrid models 58, while keeping proprietary information relating to the parametric hybrid models 58 secure.

It will be appreciated that the graphical modeling tool 82 described above with respect to FIG. 7 may be decentralized in operation with respect to the control/optimization system 200 of FIG. 16. For example, in the embodiment illustrated in FIG. 16, the graphical modeling tool 82 may be distributed among the decision support server 206 and the model servers 210, 212. More specifically, in certain embodiments, the graphical modeling tool 82 may actually be executed on the centralized decision support server 206, and the graphical modeling tool 82 will communicate to the distributed parametric hybrid models 58, which are located on the distributed model servers 210, 212. When the graphical modeling tool 82 is manipulated by a user, the parametric hybrid model objects 214 may be instantiated on (or deleted from) their respective model servers 210, 212 in response to command inputs received by the graphical modeling tool 82 that is executed on the decision support server 206. Once instantiated, the parametric hybrid model objects 214 may communicate via the communication protocol 224 back to the graphical modeling tool 82, enabling distributed operation of the graphical modeling tool 82. However, the parametric hybrid model objects 214 will only communicate across the communication protocol 224 via the interfaces 216 that are part of the parametric hybrid model objects 214. As such, proprietary information relating to the parametric hybrid models 58 (that are part of the parametric hybrid model objects 214) will be maintained secure from those that should not have access to it. Although described as being executed on the decision support server 206, it will be appreciated that the graphical modeling tool 82 may instead be executed on any of the model servers 210, 212 in other embodiments. Indeed, in certain embodiments, the graphical modeling tool 82 may be split into several software modules, each of which are executed on their respective servers 206, 210, 212 and communicate with each other over the communication network 108 via the communication protocol 224.

As such, the embodiments described herein enable a computer-implemented method whereby a plurality of parametric hybrid model objects 214 are instantiated on a plurality of model servers 210, 212. Each of the plurality of parametric hybrid model objects 214 includes a parametric hybrid model 58. The one or more decision engines 208 (e.g., one or more distributed decision engine software modules) may request information from the plurality of parametric hybrid model objects 214 through the communication network 108 via the communication protocol 224. As described above, the parametric hybrid model objects 214 may function as servers, generating responses to the requests for information. More specifically, the parametric hybrid model objects 214 may generate approximations over a future horizon of interest for information that would otherwise be generated by their respective parametric hybrid models 58. These online approximations will ensure that information tagged (e.g., by the graphical modeling tool 82) as being proprietary information is not sent as part of the responses. Rather, the online approximations will only include information that is not tagged as being proprietary information. Conversely, the parametric hybrid models 58 may utilize the proprietary information in generating the online approximations that are sent back to the one or more decision engines 208. But, the interfaces 216 of the parametric hybrid model objects 214, in conjunction with the communication protocol 224, do not allow such proprietary information to be returned as part of the online approximations that are sent to the one or more decision engines 208.

Based at least in part on the information received from the plurality of parametric hybrid model objects 214, the one or more decision engines 208, either individually or collectively as a group of interconnected software modules, may generate control commands that may be transmitted back through the communication network 108 to at least one of the parametric hybrid model objects 214, where the control commands may be used to control an industrial automation component (e.g., the components 102 illustrated in FIG. 7).

It will be appreciated that each of the distributed parametric hybrid models 58 may communicate with sensors 98 and actuators 100 at the respective facilities 202, 204 as described above with respect to FIG. 7 to facilitate optimization and control of the components 102 of the facilities 202, 204. The use of data-driven probing of secure parametric hybrid models 58 enables efficient approximation of relatively complex dynamic models in substantially real-time. As used herein, the term "substantially real-time" is intended to mean that each successive cycle of optimization calculations and control functions performed by the control/optimization system 200 (or control/optimization system 96) is executed almost immediately in succession of one other. In other words, once an iteration of optimization calculations and control functions is completed, the next iteration begins. As such, in certain embodiments, the optimization calculations and control functions are performed every second, or even more frequently, during operation of the system 10 being controlled. The use of PUNDA modeling techniques as part of the parametric hybrid model architecture offers one computationally efficient possibility for accurately approximating the relatively complex dynamic processes that may be part of the system 10 being controlled. By reasonable extension, any online/real-time probing strategy of the secure parametric hybrid models 58 that may result in a computationally workable representation of the secure parametric hybrid models 58 may also be utilized by the embodiments described herein (e.g., Legendre series, wavelets, support vector machines (SVMs), and so forth).

In addition, the data-driven model approximation of the secure parametric hybrid models 58 is performed over a desired prediction/planning/control horizon of interest. The approximation model is generated (e.g., by the decision engine 208) as an approximation of the secure content-protected models over a trajectory in substantially real-time. This trajectory may be parameterized as a function of states, inputs, or even time. In such an embodiment, output may be viewed as a special case of state.

In addition, the embodiments described herein enable the real-time approximation of the secure parametric hybrid models 58 through multiple potentially distributed decision engines 208. More specifically, although illustrated in FIG. 16 as having only one decision support server 206, in other embodiments, multiple distributed decision support servers 206 having multiple decision engines 208 may be used. As such, the control/optimization system 200 may include both multiple distributed parametric hybrid models 58 and multiple decision engines 208 that split the functionality of optimization and control of the system. The need for distributed optimization (e.g., in which a single model is needed by more than one solver) in problems of realistic complexity has conventionally discouraged any attempt to approximate models in real-time. The embodiments described herein overcome such challenges insofar as the deployment of parametric hybrid models 58 as servers offers a reasonable option to allow real-time approximation of the secure parametric hybrid models 58 for multiple stakeholders in a distributed optimization. An alternative option is to access the secure parametric hybrid models 58 through a cloud, where all the decision engines 208 are deployed as cloud services. In addition, the secure parametric hybrid models 58 can be deployed as servers either within or outside the cloud (e.g., depending on the model owner's preferences).

In addition, the embodiments described herein utilize reliable fast access to past and current data from the plant floor, MES/business systems, and so forth. With advances in data historian and database technology, fast access to massive amounts of plant data and other types of data can be done very efficiently. The embodiments described herein include such data over a prediction/control/optimization horizon in a data historian and/or a database such that the access to the horizon data mirrors that of the access to current and historical data. The inclusion of the horizon data in a data historian/database significantly improves the efficiency of online/real-time approximation of the secure parametric hybrid models 58. In addition, in certain embodiments, the stored data can be encrypted, further securing the parametric hybrid models 58.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer-implemented method, comprising:
instantiating a plurality of model objects on a plurality of model servers, wherein each of the plurality of model objects comprises a model configured to model operation of a plant or process being controlled, and wherein at least one of the models contains protected information;
requesting information from the plurality of model objects via a communication network;
receiving the information from the plurality of model objects via the communication network;
generating an approximation of at least one of the plurality of the models of the plant or process being controlled, wherein the approximation is relevant to generating control commands;
generating control commands based at least in part on the approximation and the information received from the plurality of model objects without accessing the protected information;
transmitting the control commands to at least one of the plurality of model objects via the communication network; and
controlling operation of an industrial automation component in the plant or process based on the control commands.

2. The computer-implemented method of claim 1, wherein each of the plurality of model objects comprises a parametric hybrid model.

3. The computer-implemented method of claim 2, wherein each parametric hybrid model comprises an empirical model, a parameter model, and a parametric first-principles model.

4. The computer-implemented method of claim 2, wherein the approximation comprises an approximation of the parametric hybrid model over a future horizon of interest.

5. The computer-implemented method of claim 1, wherein the information received from the plurality of model objects does not include information tagged as protected information.

6. The computer-implemented method of claim 5, wherein at least one of the model objects comprises a parametric hybrid model that utilizes the protected information to determine the approximation.

7. The computer-implemented method of claim 1, wherein each of the model objects comprises an interface that precludes the transmission of protected information via the interface.

8. The computer-implemented method of claim 1, wherein the information and the control commands are transmitted through the communication network via a communication protocol that precludes the transmission of protected information.

9. The computer-implemented method of claim 1, wherein the information and the control commands are transmitted via a cloud.

10. A control/optimization system, comprising:
a plurality of model servers configured to store a plurality of instantiated model objects, wherein each of a plurality of model objects comprises a model configured to model operation of a plant or process being controlled;
a plurality of decision support servers configured to store a plurality of decision engine modules, wherein each of the decision engine modules comprises instructions and each of the plurality of decision support servers is configured to execute the instructions to:
request information from the plurality of model objects via a communication network;
receive the information from the plurality of model objects via the communication network, wherein the information comprises an approximation of each of the models;
generate control commands based at least in part on the information received from the plurality of model objects without accessing proprietary information utilized in the plurality of models objects, wherein the control commands are generated collectively by the plurality of decision engine modules; and
transmit the control commands to at least one of the plurality of model objects via the communication network to control operation of an industrial automation component in the plant or process.

11. The control/optimization system of claim 10, wherein each of the plurality of model objects comprises a parametric hybrid model.

12. The control/optimization system of claim 11, wherein the approximation comprises an approximation of each parametric hybrid model over a future horizon of interest.

13. The control/optimization system of claim 11, wherein each parametric hybrid model comprises an empirical model, a parameter model, and a parametric first-principles model.

14. The control/optimization system of claim 10, wherein the information received from the plurality of model objects does not include information tagged as proprietary information.

15. The control/optimization system of claim 10, wherein each of the model objects comprises an interface configured to preclude the transmission of proprietary information via the interface.

16. The control/optimization system of claim 10, wherein:
the plurality of model servers is configured to use the plurality of model objects to transmit the information through the communication network via a communication protocol that precludes the transmission of proprietary information: and
the plurality of decision support servers is configured to use the plurality of decision engine modules to transmit the control commands through the communication network via the communication protocol.

17. The control/optimization system of claim 10, wherein:
the plurality of model objects each comprises a parametric hybrid model; and
the plurality of model servers is configured to use the parametric hybrid model of each of the plurality of model objects to determine the approximation based on the proprietary information.

18. A control/optimization system, comprising:
a model server comprising an instantiated model object, wherein the model object comprises a model configured to model operation of a plant or process being controlled, and wherein the model object utilizes proprietary information and comprises an interface configured to preclude transmission of the proprietary information via the interface; and
a decision support server comprising a decision engine module, wherein the decision support server is configured to use the decision engine module to:
  request information from the model object through a communication network via a communication protocol that precludes the transmission of proprietary information;
  receive the requested information from the model object through the communication network via the communication protocol, wherein the requested information comprises an approximation of the model;
  generate control commands to control operation of an industrial automation component in the plant or process without accessing the proprietary information; and
  transmit the control commands to the model object via the communication network to control operation of the industrial automation component in the plant or process.

19. The control/optimization system of claim 18, wherein the model object comprises a parametric hybrid model.

20. The control/optimization system of claim 19, wherein the approximation comprises an approximation of the parametric hybrid model over a future horizon of interest.

21. The control/optimization system of claim 19, wherein the parametric hybrid model comprises an empirical model, a parameter model, and a parametric first-principles model.

22. The control/optimization system of claim 19, wherein model server is configured to use the parametric hybrid model to determine the approximation based on the proprietary information.

* * * * *